United States Patent
Kim et al.

(10) Patent No.: US 12,232,025 B2
(45) Date of Patent: Feb. 18, 2025

(54) METHOD AND APPARATUS FOR MANUAL CLOSED ACCESS GROUP SELECTION IN WIRELESS COMMUNICATION SYSTEM

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 17/794,121

(22) PCT Filed: Jan. 25, 2021

(86) PCT No.: PCT/KR2021/000959
§ 371 (c)(1),
(2) Date: Jul. 20, 2022

(87) PCT Pub. No.: WO2021/172768
PCT Pub. Date: Sep. 2, 2021

(65) Prior Publication Data
US 2023/0135827 A1     May 4, 2023

(30) Foreign Application Priority Data

Feb. 24, 2020 (KR) .................. 10-2020-0022482
Apr. 29, 2020 (KR) .................. 10-2020-0052747

(51) Int. Cl.
*H04W 48/18* (2009.01)
*H04W 48/16* (2009.01)
*H04W 84/04* (2009.01)

(52) U.S. Cl.
CPC .......... *H04W 48/18* (2013.01); *H04W 48/16* (2013.01); *H04W 84/042* (2013.01)

(58) Field of Classification Search
CPC .... H04W 48/18; H04W 48/16; H04W 84/042
See application file for complete search history.

(56) References Cited

U.S. PATENT DOCUMENTS

2015/0289114 A1   10/2015   Dandra et al.
2022/0369204 A1*   11/2022   Jeong ................. H04W 28/10

OTHER PUBLICATIONS

Huawei et al., "Configuration for the presentation of CAG cells for manual CAG selection", CT-199010, 3GPP TSG-CT WG1 Meeting #121, Reno, NV, USA, Nov. 11-15, 2019 (Year: 2019).*

(Continued)

*Primary Examiner* — Michael Thier
*Assistant Examiner* — Nevena Zecevic Sandhu
(74) *Attorney, Agent, or Firm* — BRYAN CAVE LEIGHTON PAISNER LLP

(57) ABSTRACT

The present disclosure relates to manual closed access group (CAG) selection in wireless communications. According to an embodiment of the present disclosure, a method performed by a central unit (CU) in a wireless communication system comprises: receiving, from a distribution unit (DU), information informing whether to allow a manual closed access group (CAG) selection on a CAG identifier (ID) not included in a list of allowed CAG IDs of a wireless device for each of public land mobile networks (PLMNs); receiving, from an access and mobility management function (AMF), a list of PLMNs supported by the AMF; determining CAG control information informing at least one PLMN for which a manual CAG selection on a CAG ID not included in the list of allowed CAG IDs of the wireless device is allowed, based on the list of PLMNs supported by the AMF and the information received from the DU; and transmitting, to the DU, the CAG control information.

15 Claims, 20 Drawing Sheets

(56) References Cited

OTHER PUBLICATIONS

ZTE, TP for NPN support to TS38.463, R3-200340, 3GPP TSG-RAN WG3 #107-e, E-Meeting, Feb. 14, 2020, sections 8.2.4.2, 8.3.1.2.
LG Electronics., Manual CAG selection, R2-2001528, 3GPP TSG-RAN WG2 Meeting #109, E-meeting, Feb. 14, 2020, section 2.
ZTE, Consideration on support CAG in NR, R3-190262, 3GPP TSG-RAN WG3 #103, Athens, Greece, Feb. 15, 2019, section 2; and figures 1-3.
Nokia et al., Discussion on NPN for F1, R3-196621, 3GPP TSG-RAN WG3 Meeting #106, Reno, USA, Nov. 9, 2019, sections 2-3.
3GPP TS 23.122 V16.4.0, Dec. 2019.
C1-196219, 3GPP TSG-CT WG1 Meeting #120, Portoroz, Slovenia, Oct. 7-11, 2019.
S1-201066, 3GPP TSG-SA WG1 Meeting #89e, Electronic Meeting, Feb. 10-14, 2020.
Ericsson, "Discussion to manual CAG Selection," 3GPP TSG-CT WG1 Meeting #122-e, C1-200731, Feb. 2020.
Huawei et al. "General Support of NPN over F1," 3GPP TSG-RAN WG3 Meeting #105, R3-194485, Aug. 2019.
OPPO "Discussion on SIB1 design for NPN," 3GPP TSG-RAN WG2 Meeting #107bis, R2-1912508, Oct. 2019.

\* cited by examiner

METHOD AND APPARATUS FOR MANUAL CLOSED ACCESS GROUP SELECTION IN WIRELESS COMMUNICATION SYSTEM

This application is the National Stage filing under 35 U.S.C. 371 of International Application No. PCT/KR2021/000959 filed on Jan. 25, 2021, which claims priority to Korean Patent Application Nos. 10-2020-0022482 filed on Feb. 24, 2020 and 10-2020-0052747 filed on Apr. 29, 2020, the contents of which are all hereby incorporated by reference herein in their entirety.

TECHNICAL FIELD

The present disclosure relates to manual closed access group (CAG) selection in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

For a public land mobile network (PLMN), one or more closed access groups (CAGs) may be associated. UE may be configured with allowed CAG list for the PLMN, and may automatically select a CAG cell related to a CAG ID in the allowed CAG list. However, in some cases, UE may manually select a CAG cell. For example, the UE may manually select a CAG ID not included in the allowed CAG list of the UE, as well as a CAG ID included in the allowed CAG list of the UE.

SUMMARY

1. Technical Problem

An aspect of the present disclosure is to provide method and apparatus for manual CAG selection in a wireless communication system.

Another aspect of the present disclosure is to provide method and apparatus for providing manual CAG selection control information in a wireless communication system.

Another aspect of the present disclosure is to provide method and apparatus for determining manual CAG selection control information in a wireless communication system.

2. Technical Solution

According to an embodiment of the present disclosure, a method performed by a central unit (CU) in a wireless communication system comprises: receiving, from a distribution unit (DU), information informing whether to allow a manual closed access group (CAG) selection on a CAG identifier (ID) not included in a list of allowed CAG IDs of a wireless device for each of public land mobile networks (PLMNs); receiving, from an access and mobility management function (AMF), a list of PLMNs supported by the AMF; determining CAG control information informing at least one PLMN for which a manual CAG selection on a CAG ID not included in the list of allowed CAG IDs of the wireless device is allowed, based on the list of PLMNs supported by the AMF and the information received from the DU; and transmitting, to the DU, the CAG control information.

According to an embodiment of the present disclosure, a method performed by a wireless device in a wireless communication system comprises: receiving, from a distributed unit (DU), closed access group (CAG) control information informing at least one public land mobile network (PLMN) for which a manual CAG selection on a CAG identifier (ID) not included in a list of allowed CAG IDs of the wireless device is allowed; manually selecting a CAG ID based on the CAG control information; and accessing a CAG cell related to the manually selected CAG ID, wherein the CAG control information is determined based on a list of PLMNs supported by an access and mobility management function (AMF) and manual CAG selection control information configured in the DU.

According to an embodiment of the present disclosure, a central unit (CU) in a wireless communication system comprises: a transceiver; a memory; and at least one processor operatively coupled to the transceiver and the memory, and configured to: control the transceiver to receive, from a distribution unit (DU), information informing whether to allow a manual closed access group (CAG) selection on a CAG identifier (ID) not included in a list of allowed CAG IDs of a wireless device for each of public land mobile networks (PLMNs); control the transceiver to receive, from an access and mobility management function (AMF), a list of PLMNs supported by the AMF; determine CAG control information informing at least one PLMN for which a manual CAG selection on a CAG ID not included in the list of allowed CAG IDs of the wireless device is allowed, based on the list of PLMNs supported by the AMF and the information received from the DU; and control the transceiver to transmit, to the DU, the CAG control information.

According to an embodiment of the present disclosure, a wireless device in a wireless communication system comprises: a transceiver; a memory; and at least one processor operatively coupled to the transceiver and the memory, and configured to: control the transceiver to receive, from a distributed unit (DU), closed access group (CAG) control information informing at least one public land mobile network (PLMN) for which a manual CAG selection on a CAG identifier (ID) not included in a list of allowed CAG IDs of the wireless device is allowed; manually select a CAG ID based on the CAG control information; and access a CAG cell related to the manually selected CAG ID, wherein the CAG control information is determined based on a list of PLMNs supported by an access and mobility management function (AMF) and manual CAG selection control information configured in the DU.

3. Advantageous Effect

The present disclosure can have various advantageous effects.

For example, CU and/or AMF can determine whether to allow a manual CAG selection by a UE for a specific CAG ID associated with a PLMN based on a situation/circumstance of the PLMN.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
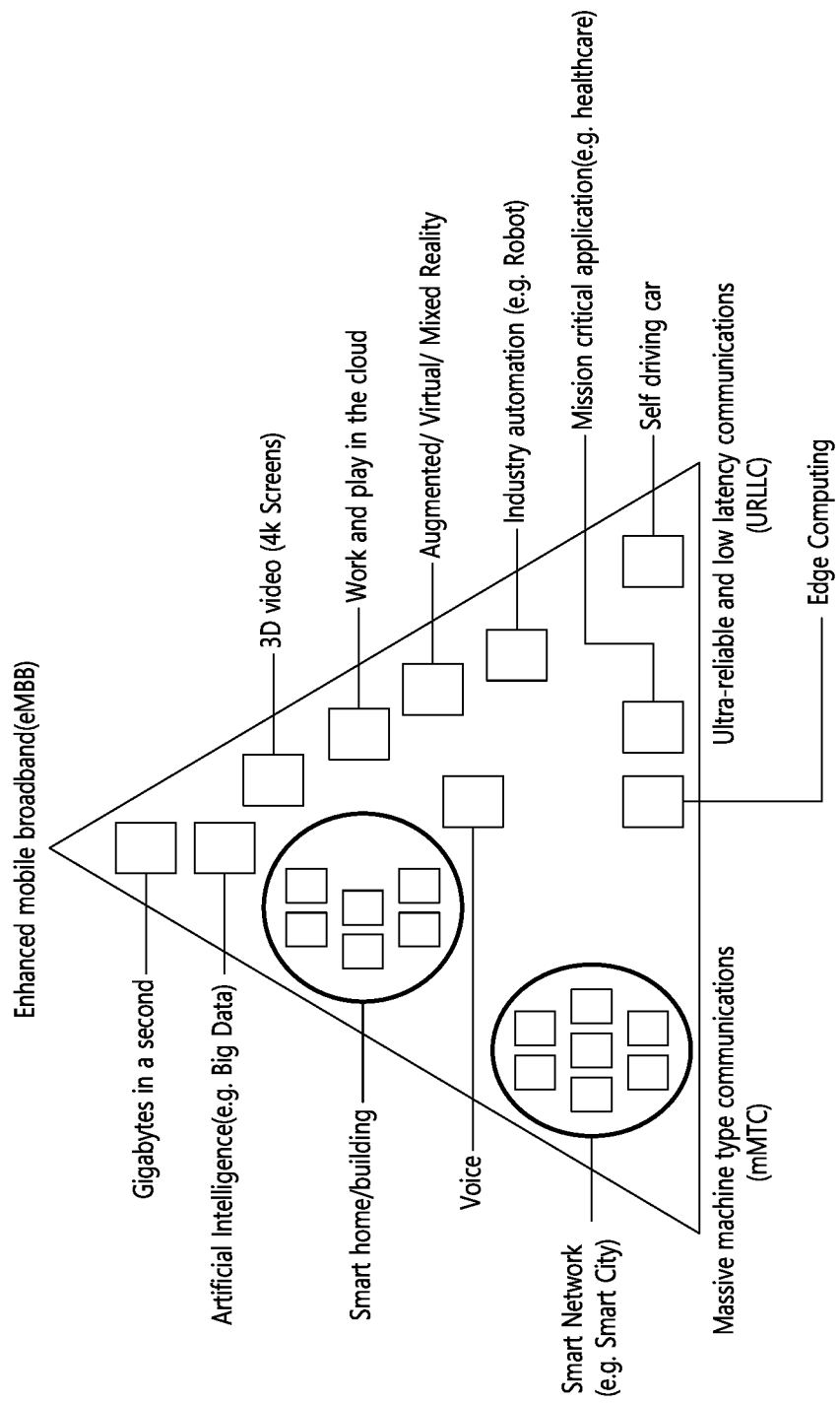
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
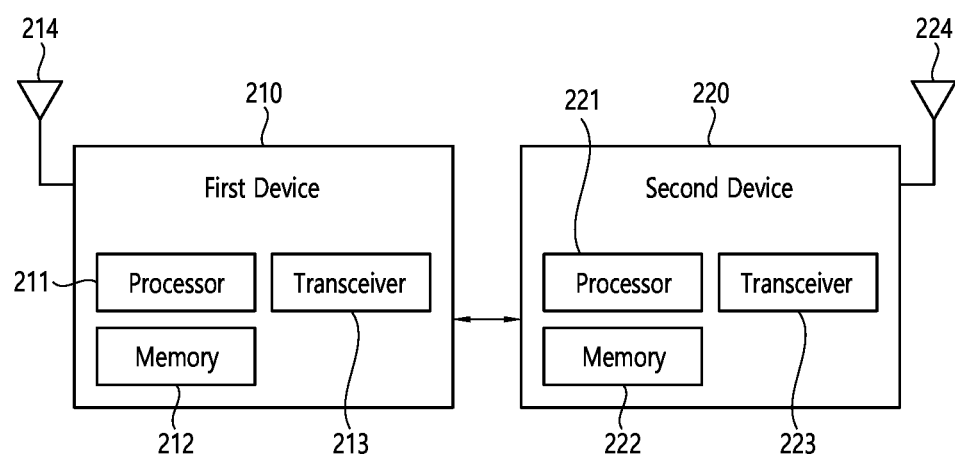
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
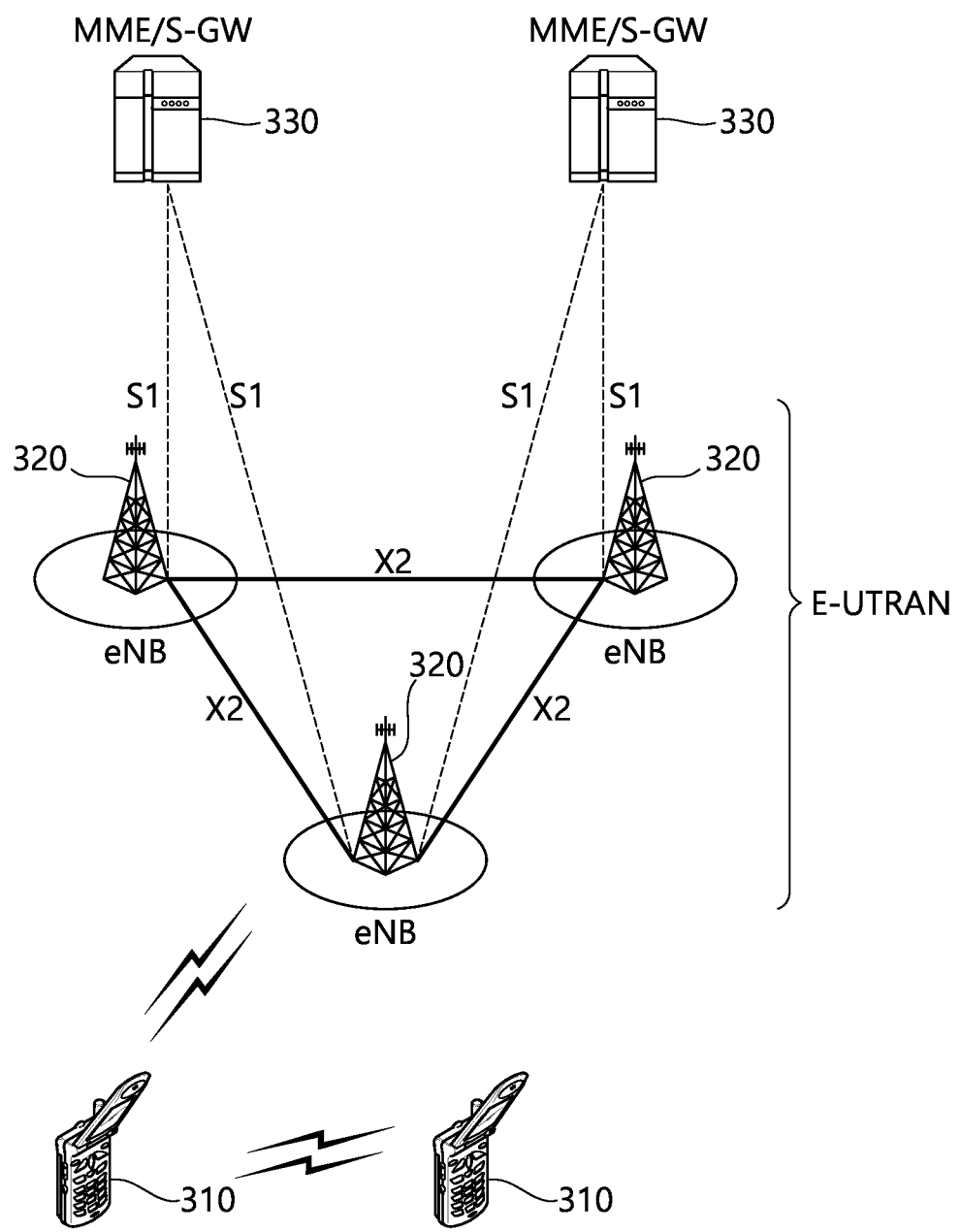
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
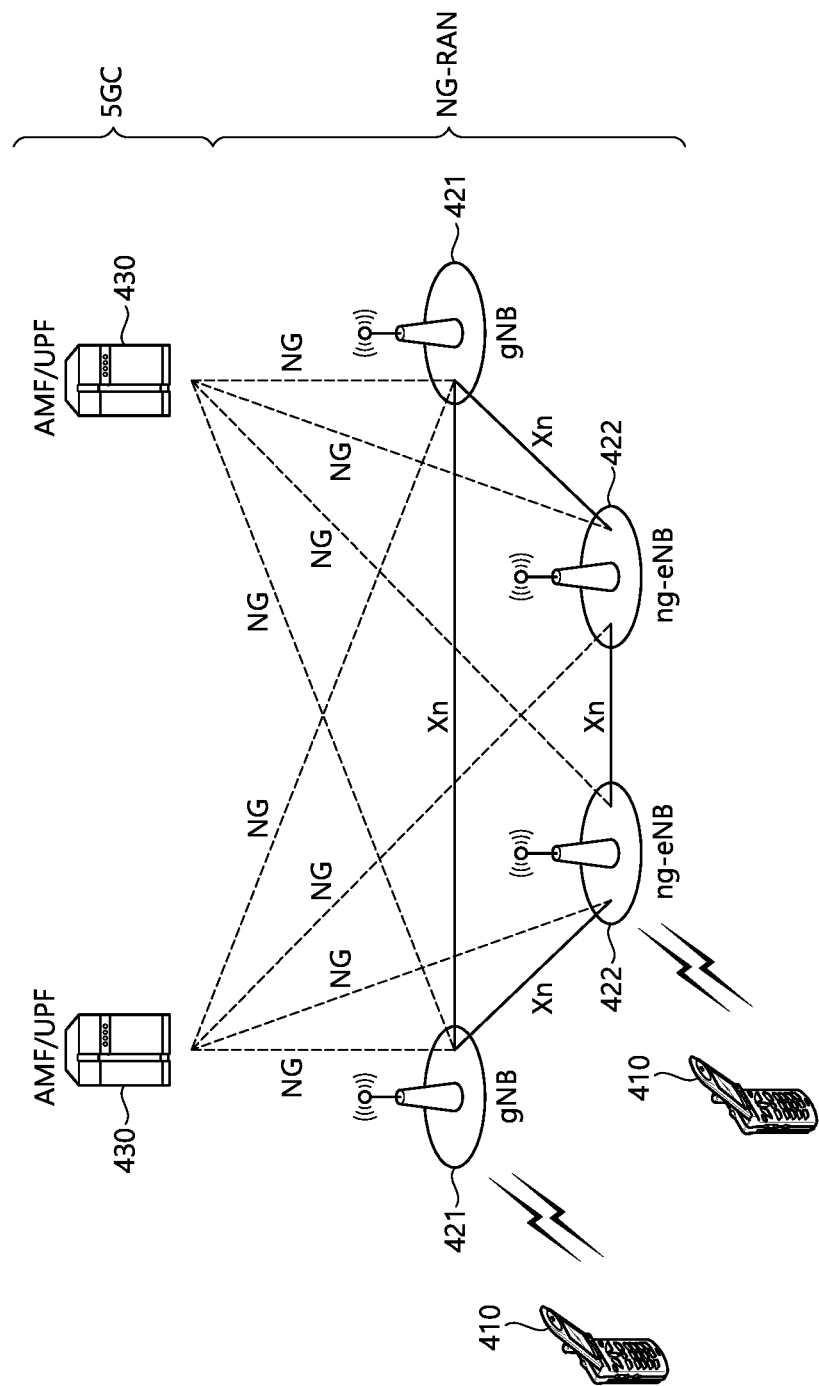
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
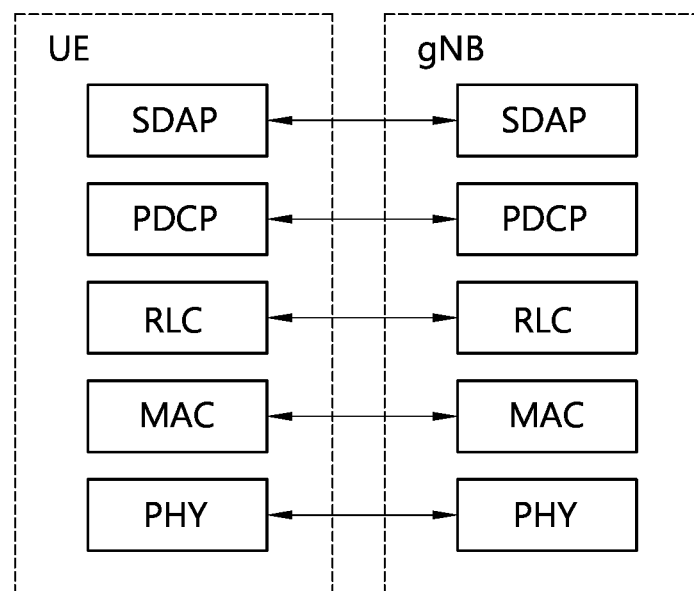
FIG. 5 shows a block diagram of a user plane protocol stack to which the technical features of the present disclosure can be applied.
Figure 6:
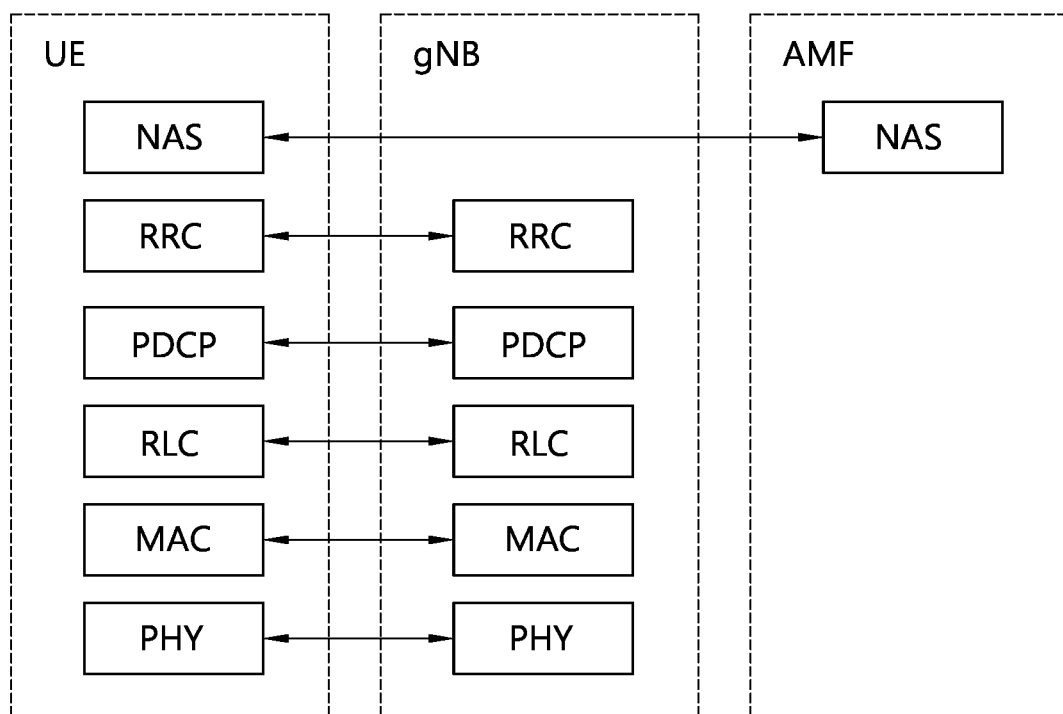
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode™, unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
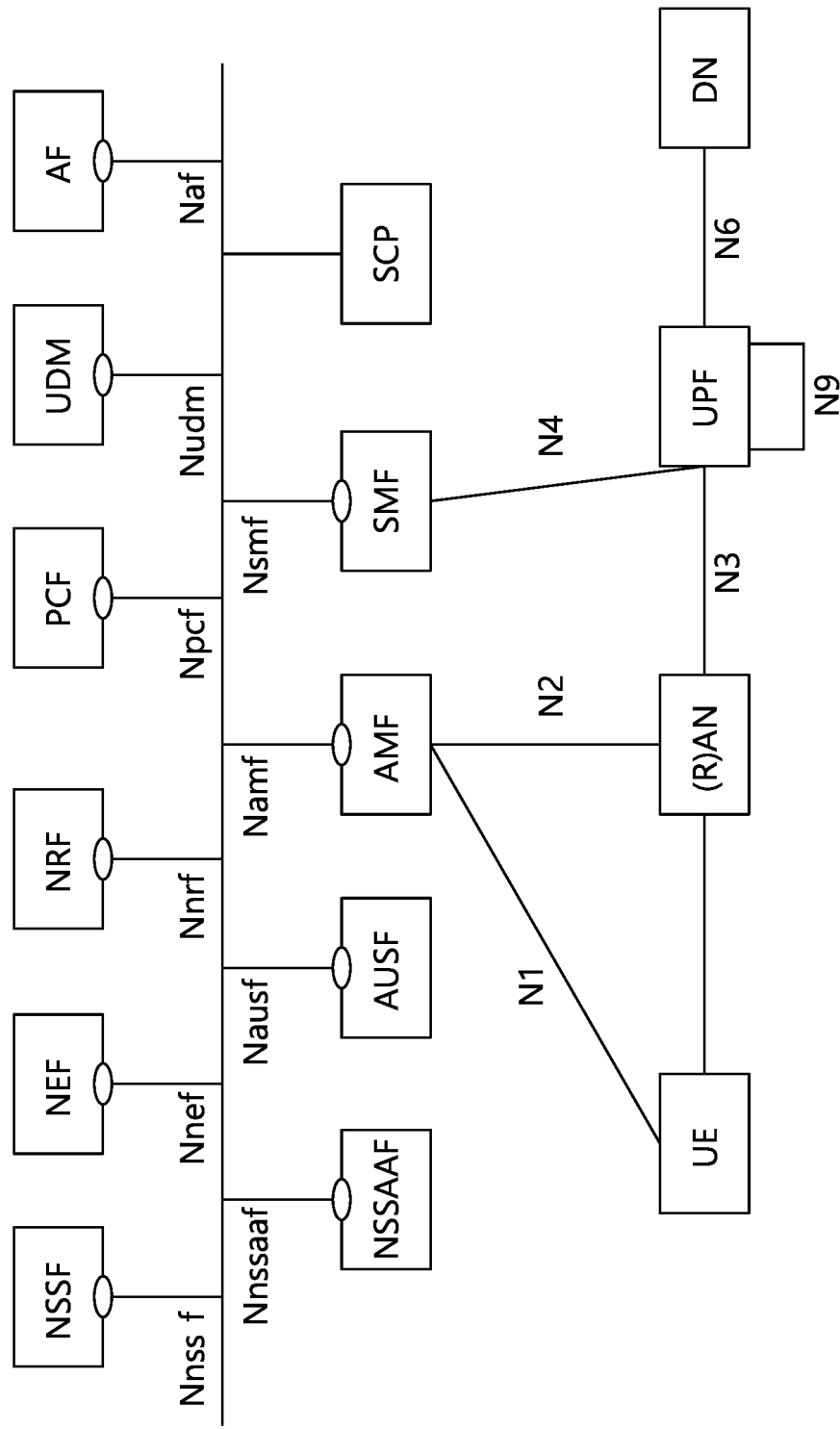
FIG. 7 shows an example of a system architecture for a communication system to which technical features of the present disclosure can be applied.

FIG. 7 shows an example of a system architecture for a communication system to which technical features of the present disclosure can be applied. An example of the communication system may comprise a 5G system and/or NR system.

Referring to FIG. 7, the communication system may comprise various core network entities, such as an access and mobility management function (AMF), a session management function (SMF), a user plane function (UPF), a policy control function (PCF), an authentication server function (AUSF), a unified data management (UDM), an application function (AF), a network exposure function (NEF), a network function repository function (NRF), a network slice selection function (NSSF), a network slice specific authentication and authorization function (NS-SAAF) and a service communication proxy (SCP).

The AMF may support a termination of non-access stratum (NAS) signalling, NAS ciphering & integrity protection, registration management, connection management, mobility management, access authentication and authorization, security context management. The AMF may be associated with N1, N2 and Namf. The N1 is a reference point between the UE and the AMF. The N2 is a reference point between the RAN and the AMF. The Namf is a service-based interface exhibited by the AMF.

The SMF may support a session management (session establishment, modification, release), UE internet protocol (IP) address allocation & management, dynamic host configuration protocol (DHCP) functions, termination of NAS signalling related to session management, DL data notification, traffic steering configuration for UPF for proper traffic routing. The SMF may be associated with N4 and Nsmf. The N4 is a reference point between the SMF and the UPF. The Nsmf is a service-based interface exhibited by the SMF.

The UPF may support packet routing & forwarding, packet inspection, quality of service (QoS) handling, acts as external protocol data unit (PDU) session point of interconnect to Data Network (DN), and may be an anchor point for intra- & inter-radio access technology (RAT) mobility. The UPF may be associated with N3, N4, N6 and N9. The N3 is a reference point between the RAN and the UPF. The N6 is a reference point between the UPF and the DN. The N9 is a reference point between two UPFs.

The PCF may support unified policy framework, providing policy rules to control plane (CP) functions, access subscription information for policy decisions in a unified data repository (UDR). The PCF may be associated with Npcf. The Npcf is a service-based interface exhibited by the PCF.

The AUSF may act as an authentication server. The AUSF may be associated with Nausf. The Nausf is a service-based interface exhibited by the AUSF.

The UDM may support generation of Authentication and Key Agreement (AKA) credentials, user identification handling, access authorization, subscription management. The UDM may be associated with Nudm. The Nudm is a service-based interface exhibited by the UDM.

The AF may support application influence on traffic routing, accessing NEF, interaction with policy framework for policy control. The AF may be associated with Naf. The Naf is a service-based interface exhibited by the AF.

The NEF may support exposure of capabilities and events, secure provision of information from external application to 3GPP network, translation of internal/external information. The NEF may be associated with Nnef. The Nnef is a service-based interface exhibited by the NEF.

The NRF may support service discovery function, maintains NF profile and available NF instances. The NRF may be associated with Nnrf. The Nnrf is a service-based interface exhibited by the NRF.

The NSSF may support selecting of the Network Slice instances to serve the UE, determining the allowed network slice selection assistance information (NSSAI), determining the AMF set to be used to serve the UE. The NSSF may be associated with Nnssf. The Nnssf is a service-based interface exhibited by the NSSF.

The NSSAAF may support Network Slice-Specific Authentication and Authorization with a AAA Server (AAA-S). If the AAA-S belongs to a third party, the NSSAAF may contact the AAA-S via an a AAA proxy (AAA-P). The NSSAAF may be associated with Nnssaaf. The Nnssaaf is a service-based interface exhibited by the NSSAAF.

The SCP may support indirect communication, delegated discovery, message forwarding and routing to destination network function (NF)/NF service, Message forwarding and routing to a next hop SCP, communication security (e.g. authorization of the NF Service Consumer to access the NF Service Producer API), load balancing, monitoring, overload control, optionally interact with UDR, to resolve the UDM Group ID/UDR Group ID/AUSF Group ID/PCF Group ID/charging function (CHF) Group ID/home subscriber server (HSS) Group ID based on UE identity (e.g., subscription permanent identifier (SUPI) or international mobility subscriber identity (IMPI)/IP multimedia public identity (IMPU)).

Figure 8:
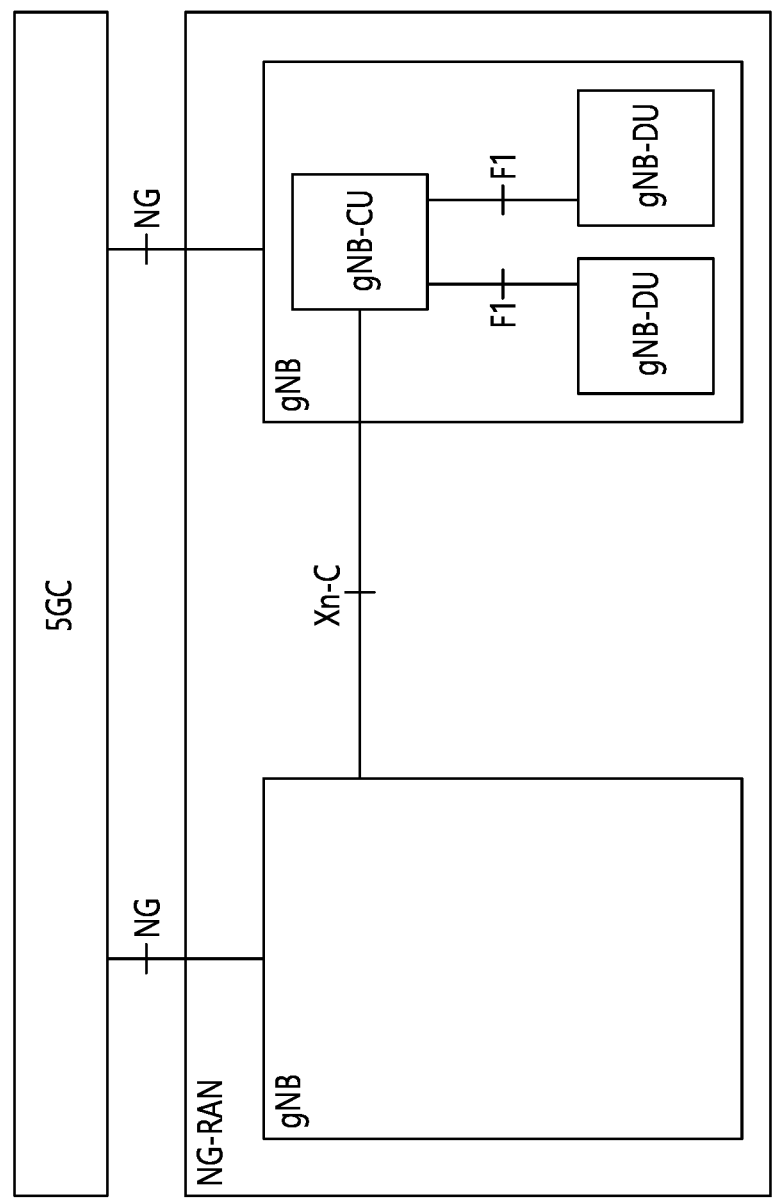
FIG. 8 shows an example of the overall architecture of an NG-RAN to which technical features of the present disclosure can be applied.

FIG. 8 shows an example of the overall architecture of an NG-RAN to which technical features of the present disclosure can be applied.

Referring to FIG. 8, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 interface management function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

(2) System Information management function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE context management function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC message transfer function

This function allows to transfer RRC messages between gNB-CU and gNB-DU. RRC messages are transferred over F1-C. The gNB-CU is responsible for the encoding of the dedicated RRC message with assistance information provided by gNB-DU.

Figure 9:
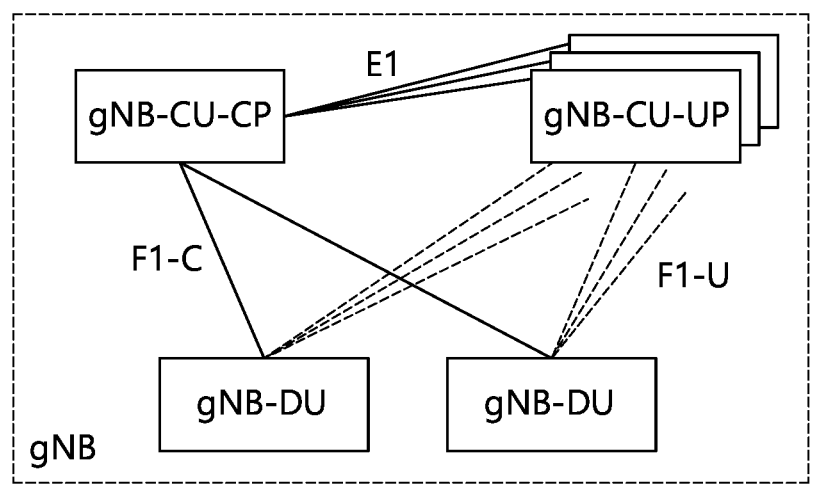
FIG. 9 shows an example of overall architecture for separation of gNB-CU-control plane (gNB-CU-CP) and gNB-CU-user plane (gNB-CU-UP) to which technical features of the present disclosure can be applied.

FIG. 9 shows an example of overall architecture for separation of gNB-CU-control plane (gNB-CU-CP) and gNB-CU-user plane (gNB-CU-UP) to which technical features of the present disclosure can be applied.

Referring to FIG. 9, a gNB may include a gNB-CU-CP, multiple gNB-CU-UPs and multiple gNB-DUs. A gNB-CU-CP may be simply referred to as CU-CP and a gNB-CU-UP may be simply referred to as CU-UP. The gNB-CU-CP and the gNB-CU-UP may be included in gNB-CU.

The gNB-CU-CP may be a logical node hosting an RRC and a control plane part of a PDCP protocol of the gNB-CU for a gNB. As illustrated, the gNB-CU-CP is connected to the gNB-DU through F1-C interface. The gNB-CU-CP terminates an E1 interface connected with the gNB-CU-UP and the F1-C interface connected with the gNB-DU.

The gNB-CU-UP may be a logical node hosting a user plane part of the PDCP protocol of the gNB-CU for a gNB, and the user plane part of the PDCP protocol and a SDAP protocol of the gNB-CU for a gNB. As illustrated, the gNB-CU-UP is connected to the gNB-DU through F1-U interface, and is connected to the gNB-CU-CP through the E1 interface. The gNB-CU-UP terminates the E1 interface connected with the gNB-Cu-CP and the F1-U interface connected with the gNB-DU.

According to an illustration shown in FIG. 9, the following properties may hold:
(1) A gNB-DU may be connected to a gNB-CU-CP.
(2) A gNB-CU-UP may be connected to a gNB-CU-CP.
(3) A gNB-DU can be connected to multiple gNB-CU-UPs under the control of the same gNB-CU-CP (i.e., the gNB-CU-CP to which the gNB-DU is connected and the multiple gNB-CU-UPs are connected).
(4) A gNB-CU-UP can be connected to multiple DUs under the control of the same gNB-CU-CP (i.e., the gNB-CU-CP to which the gNB-CU-UP is connected and the multiple DUs are connected).

Hereinafter, details regarding public network integrated non-public network (PNI-NPN) are described.

PNI-NPNs may be NPNs may be NPNs made available via PLMNs (e.g., by means of dedicated DNNs, or by one (or more) Network Slice instances allocated for the NPN). The existing network slicing functionalities may apply. When a PNI-NPN is made available via a PLMN, then the UE shall have a subscription for the PLMN in order to access PNI-NPN.

As network slicing does not enable the possibility to prevent UEs from trying to access the network in areas where the UE is not allowed to use the Network Slice allocated for the NPN, Closed Access Groups (CAGs) may optionally be used to apply access control.

A CAG may identify a group of subscribers who are permitted to access one or more CAG cells associated to the CAG.

CAG may be used for PNI-NPNs to prevent UE(s), which are not allowed to access the NPN via the associated cell(s), from automatically selecting and accessing the associated CAG cell(s).

CAG may be used for access control (e.g., authorization at cell selection) and configured in the subscription as part of the mobility restrictions (i.e., independent from any single NSSAI (S-NSSAI)). CAG may not be used as input to AMF selection nor Network Slice selection. If NPN isolation is desired, operator can better support NPN isolation by deploying network slicing for PNI-NPN, configuring dedicated S-NSSAI(s) for the given NPN and restricting NPN's UE subscriptions to these dedicated S-NSSAI(s).

A CAG may be identified by a CAG identifier (ID) which is unique within the scope of a PLMN ID.

A CAG cell may broadcast one or multiple CAG IDs per PLMN. For example, a CAG cell may support broadcasting a total of 12 CAG IDs. A CAG cell may in addition broadcast a human-readable network name per CAG ID. The human-readable network name per CAG ID may only be used for presentation to user when user requests a manual CAG selection.

To use CAG, the UE, that supports CAG as indicated as part of the UE 5G mobility management (MM) Core Network Capability, may be pre-configured or (re)configured with the following CAG information, included in the subscription as part of the Mobility Restrictions:
   an Allowed CAG list, which comprises a list of CAG IDs the UE is allowed to access; and/or
   optionally, a CAG-only indication whether the UE is only allowed to access 5GS via CAG cells.

The home PLMN (HPLMN) may configure or re-configure a UE with the above CAG information using the UE Configuration Update procedure for access and mobility management related parameters.

The above CAG information may be provided by the HPLMN on a per PLMN basis. In a PLMN, the UE shall only consider the CAG information provided for this PLMN.

When the subscribed CAG information changes, UDM may set a CAG information Subscription Change Indication and send the CAG information subscription change indication to the AMF. The AMF shall provide the UE with the CAG information when the UDM indicates that the CAG information within the Access and Mobility Subscription data has been changed. When AMF receives the indication from the UDM that the CAG information within the Access and Mobility Subscription has changed, the AMF may use the CAG information received from the UDM to update the UE. Once the AMF updates the UE and obtains an acknowledgment from the UE, the AMF may inform the UDM that the update was successful and the UDM may clear the CAG information Subscription Change Indication flag.

The AMF may update the UE using either the UE Configuration Update procedure after registration procedure is completed, or by including the new CAG information in the Registration Accept or in the Registration Reject.

When the UE is roaming and the Serving PLMN provides CAG information, the UE shall update only the CAG information provided for the Serving PLMN while the stored CAG information for other PLMNs are not updated. When the UE is not roaming and the HPLMN provides CAG information, the UE shall update the CAG information stored in the UE with the received CAG information for all the PLMNs.

The UE shall store the latest available CAG information for every PLMN for which the CAG information is provided and keep the CAG information stored when the UE is de-registered or switched off.

The CAG cell shall broadcast information such that only UEs supporting CAG are accessing the cell.

In order to prevent access to NPNs for authorized UE(s) in the case of network congestion/overload, existing mechanisms defined for Control Plane load control, congestion and overload control can be used, as well as the access control and barring functionality or Unified Access Control using the access categories can be used.

The Mobility Restrictions shall be able to restrict the UE's mobility according to the Allowed CAG list (if configured in the subscription) and include an indication whether the UE is only allowed to access CAG cells (if configured in the subscription).

During transition from CM-IDLE to CM-CONNECTED, if the UE is accessing the 5GS via a CAG cell, the AMF shall verify whether UE access is allowed by Mobility Restrictions. The AMF may be aware of the supported CAG Identifier(s) of the CAG cell by the NG-RAN. If at least one of the CAG Identifier(s) received from the NG-RAN is part of the UE's Allowed CAG list, then the AMF may accept the NAS request. If none of the CAG Identifier(s) received from the NG-RAN are part of the UE's Allowed CAG list, then the AMF may reject the NAS request and the AMF should include CAG information in the NAS reject message. The AMF shall then release the NAS signalling connection for the UE by triggering the AN release procedure. If the UE is accessing the network via a non-CAG cell and the UE's subscription contains an indication that the UE is only allowed to access CAG cells, then the AMF may reject the NAS request and the AMF should include CAG information in the NAS reject message. The AMF shall then release the NAS signalling connection for the UE by triggering the AN release procedure.

During transition from RRC Inactive to RRC Connected state, when the UE initiates the RRC Resume procedure for RRC Inactive to RRC Connected state transition in a CAG cell, NG-RAN shall reject the RRC Resume request from the UE if none of the CAG Identifiers supported by the CAG cell are part of the UE's Allowed CAG list according to the Mobility Restrictions received from the AMF. When the UE initiates the RRC Resume procedure for RRC Inactive to RRC Connected state transition in a non-CAG cell, NG-RAN shall reject the UE's Resume request if the UE is only allowed to access CAG cells according to the Mobility Restrictions received from the AMF.

During connected mode mobility procedures, based on the Mobility Restrictions received from the AMF, source NG-RAN shall not handover the UE to a target NG-RAN node if the target is a CAG cell and none of the CAG Identifiers supported by the CAG cell are part of the UE's Allowed CAG list. Source NG-RAN shall not handover the UE to a non-CAG cell if the UE is only allowed to access CAG cells. If the target cell is a CAG cell, target NG-RAN shall reject the N2 based handover procedure if none of the CAG Identifiers supported by the CAG cell are part of the UE's Allowed CAG list in the Mobility Restriction List. If the target cell is a non-CAG cell, target NG-RAN shall reject the N2 based handover procedure if the UE is only allowed to access CAG cells based on the Mobility Restriction List.

When the AMF receives the Nudm_SDM_Notification from the UDM and the AMF determines that the Allowed CAG list or the indication whether the UE is only allowed to access CAG cells have changed, the AMF shall update the Mobility Restrictions in the UE and NG-RAN accordingly under the conditions.

Emergency Services may be supported in CAG cells, for UEs supporting CAG, whether normally registered or emergency registered.

A UE may camp on an acceptable CAG cell in limited service, based on operator policy.

For UEs not supporting CAG, but are emergency registered, emergency Services may be supported based on operator policy. Support for Emergency services may require each cell with a Cell Identity associated with PLMNs or PNI-NPNs to only be connected to AMFs that supports emergency services.

The UE shall select a PLMN (of a CAG cell or non-CAG cell), when initiating emergency services from limited service state.

During handover to a CAG cell, if the UE is not authorized to access the target CAG cell and has emergency services, the target NG-RAN node may only accept the emergency PDU sessions and the target AMF may release the non-emergency PDU connections that were not accepted by the NG-RAN node. Upon completion of handover, the UE may behave as emergency registered.

Hereinafter, details regarding manual CAG selection is described.

If the MS supports CAG, the MS can be provisioned with a "CAG information list". The CAG information list may comprise zero or more entries comprising: a PLMN ID; an "Allowed CAG list" containing zero or more CAG-IDs; and/or an optional "indication that the MS is only allowed to access 5GS via CAG cells".

The "CAG information list" may be stored in the ME. When the UE is registering or registered to a PLMN other than the HPLMN, a PLMN equivalent to the HPLMN or EHPLMN, then the HPLMN will send a "CAG information list" comprising CAG subscription information related to the serving PLMN only. When the UE is registering or registered to the HPLMN, a PLMN equivalent to the HPLMN or EHPLMN then the HPLMN or EHPLMN may send CAG subscription information related to any PLMN in the "CAG information list".

The NAS shall provide the AS with a "CAG information list", if available. If the contents of the "CAG information list" have changed, the NAS shall provide an updated "CAG information list" to the AS.

If the MS supports CAG and a PLMN is selected according to manual network selection mode procedure, the manual CAG selection may be performed.

The MS may indicate whether there are any PLMNs, which are available using all supported access technologies. The PLMNs may include PLMNs in the "forbidden PLMNs" list, "forbidden PLMNs for GPRS service" list and PLMNs which only offer services not supported by the MS. An MS which supports GSM COMPACT shall also indicate GSM COMPACT PLMNs (which use PBCCH).

If displayed, PLMNs meeting the criteria above are presented in the following order:

1) either the HPLMN (if the EHPLMN list is not present or is empty) or, if one or more of the EHPLMNs are available then based on an optional data field on the SIM either only the highest priority available EHPLMN is to be presented to the user_or all available EHPLMNs are presented to the user in priority order. If the data field is not present on the SIM, then only the highest priority available EHPLMN is presented;

2) PLMN/access technology combinations contained in the "User Controlled PLMN Selector with Access Technology" data file in the SIM (in priority order);

3) PLMN/access technology combinations contained in the "Operator Controlled PLMN Selector with Access Technology" data file in the SIM (in priority order) or stored in the ME (in priority order);

4) other PLMN/access technology combinations with received high quality signal in random order;

5) other PLMN/access technology combinations in order of decreasing signal quality.

In 1) to 5), if the MS supports CAG, for each PLMN/access technology combination of NG-RAN access technology, the MS shall present to the user the followings:

The PLMN/access technology combination and a list of CAG-IDs composed of one or more CAG-IDs. For each CAG ID, there may be an available CAG cell which broadcasts the CAG-ID for the PLMN. Further, for each CAG ID, i) there may exist an entry with the PLMN ID of the PLMN in the "CAG information list" and the CAG-ID may be included in the "Allowed CAG list" of the entry; or ii) the available CAG cell broadcasting the CAG-ID for the PLMN may also broadcast that the PLMN allows a user to manually select the CAG-ID. For each of the presented CAG-ID, the MS may indicate to the user whether the CAG-ID is present in the "Allowed CAG list" stored in the UE; and The PLMN/access technology combination without a list of CAG-IDs, if there is an available NG-RAN cell which is not a CAG cell for the PLMN. If there exists an entry for the presented PLMN in the "CAG information list" and the entry includes an "indication that the MS is only allowed to access 5GS via CAG cells", the MS may indicate to the user that the MS is only allowed to access the PLMN via CAG cells.

If during manual CAG selection, the NAS may receive a human-readable network name associated with a CAG-ID and a PLMN ID from the AS, the human-readable network name shall be sent along with the CAG-ID and PLMN ID to the upper layer. A human-readable network name can be broadcasted per CAG-ID and PLMN ID by a CAG cell.

Upon selection of a PLMN (and CAG-ID if the user selected a desired CAG-ID as well) by the user, the NAS shall provide the AS with the selected PLMN ID (and CAG-ID if the user selected a desired CAG-ID as well or an indication to select a non-CAG cell if the user did not select any CAG-ID) and the MS may initiate registration on this PLMN (and on a cell which broadcasts the CAG-ID if the user selected a desired CAG-ID as well) using the access technology chosen by the user for that PLMN or using the highest priority available access technology for that PLMN, if the associated access technologies have a priority order (this may take place at any time during the presentation of PLMNs). For such a registration, the MS shall ignore the contents of the "forbidden location areas for roaming", "forbidden tracking areas for roaming", "5GS forbidden tracking areas for roaming", "forbidden location areas for regional provision of service", "forbidden tracking areas for regional provision of service", "5GS forbidden tracking areas for regional provision of service", "forbidden PLMNs for GPRS service" and "forbidden PLMNs" lists.

The MS may indicate access technologies to the user or not. If the MS does display access technologies, then the access technology selected by the user may only be used for initial registration on the selected PLMN. If the MS does not display access technologies, then the access technology chosen for a particular PLMN should be the highest priority available access technology for that PLMN, if the associated access technologies have a priority order, and are only used for initial registration.

If the UE has a PDU session for emergency services, manual CAG selection shall not be performed.

In a wireless communication system, a PLMN may control whether a user of a UE can manually select a non-public network hosted by the PLMN that the UE is not authorized to select automatically. For example, the PLMN may control whether a user of a UE can manually select a CAG ID not included in an allowed CAG list of the UE for the PLMN as well as a CAG ID included in the allowed CAG list of the UE for the PLMN (i.e., all the available CAG IDs) However, it is still undefined how to indicate to the UE whether the user shall be presented with all the available CAG IDs or not—that is, it is still undefined how to indicate, to the UE, manual CAG selection control information for each PLMN.

Therefore, various embodiments of the present disclosure provide solutions on how to indicate, to the UE, the manual CAG selection control information by using SIB in F1 interface.

Figure 10:
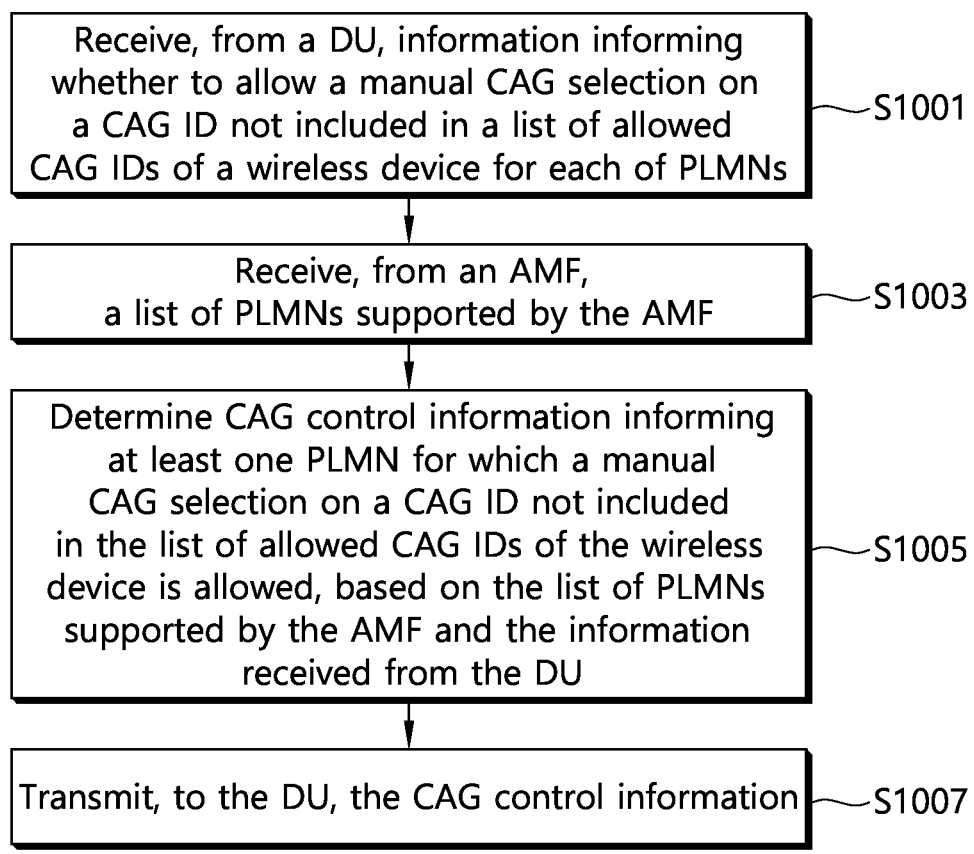
FIG. 10 shows an example of a method for providing manual CAG selection control information for each PLMN according to an embodiment of the present disclosure.

FIG. 10 shows an example of a method for providing manual CAG selection control information for each PLMN according to an embodiment of the present disclosure. Steps illustrated in FIG. 10 may be performed by a CU.

Referring to FIG. 10, in step S1001, the CU may receive, from a DU, information informing whether to allow a manual CAG selection on a CAG ID not included in a list of allowed CAG IDs of a wireless device for each of PLMNs. That is, the CU may receive, from the DU, manual CAG selection control information for each of PLMNs. For example, the manual CAG selection control information for a PLMN may indicate whether to allow a manual CAG selection on a CAG ID not included in an allowed CAG list of a wireless device for the PLMN as well as a CAG ID only included in the allowed CAG list of the UE for the PLMN. That is, the manual CAG selection control information for a PLMN may indicate at least whether to allow a CAG ID not included in an allowed CAG list of a wireless device for the PLMN.

In step S1003, the CU may receive, from an AMF, a list of PLMN supported by the AMF.

In step S1005, the CU may determine CAG control information informing at least one PLMN for which a manual CAG selection on a CAG ID not included in the list of allowed CAG IDs of the wireless device is allowed, based on the list of PLMNs supported by the AMF and the information received from the DU. For example, the CU may finally determine manual CAG selection control information for the at least one PLMN indicating that a manual CAG selection on a CAG ID not included in the list of allowed CAG IDs of the wireless device is allowed for the at least one PLMN, based on the list of PLMNs supported by the AMF and the information received from the DU.

In step S1007, the CU may transmit, to the DU, the CAG control information. The CU may transmit the manual CAG selection control information for the at least one PLMN that is finally determined by the CU.

According to various embodiments, the CU may determine CAG control information informing at least one other PLMN for which a manual CAG selection on a CAG ID not included in the list of allowed CAG IDs of the wireless device is not allowed, based on the list of PLMNs supported by the AMF and the information received from the DU.

According to various embodiments, the CU may transmit, to the AMF, the information informing whether to allow a manual CAG selection on a CAG ID not included in the list of allowed CAG IDs of the wireless device for each of the PLMNs. The CAG control information may be determined by the AMF based on the list of PLMNs supported by the AMF and the information, after transmitting the information to the AMF.

According to various embodiments, the CU may generate system information comprising the CAG control information. The CU may transmit the system information comprising the CAG control information to the DU.

According to various embodiments, the CAG control information may be transmitted to the DU via a F1AP SETUP RESPONSE message. The CAG control information may be encoded at the DU and broadcasted by the DU to wireless devices via system information. The system information may comprise at least one of a system information block type 1 (SIB1) or SIB10.

According to various embodiments, the CAG control information may be transmitted to the DU via a F1AP GNB CU CONFIGURATION UPDATE message.

According to various embodiments, the information may be received from the DU via a F1AP SETUP REQUEST message. The list of PLMNs supported by the AMF may be received from the AMF via a NGAP NG SETUP RESPONSE message.

The CU in FIG. 10 may be an example of a second device 220 in FIG. 2, and therefore, steps of the CU as illustrated in FIG. 10 may be implemented by the second device 220. For example, the processor 221 may be configured to control the transceiver 223 to receive, from a DU, information informing whether to allow a manual CAG selection on a CAG ID not included in a list of allowed CAG IDs of a wireless device for each of PLMNs. The processor 221 may be configured to control the transceiver 223 to receive, from an AMF, a list of PLMNs supported by the AMF. The processor 221 may determine CAG control information informing at least one PLMN for which a manual CAG selection on a CAG ID not included in the list of allowed CAG IDs of the wireless device is allowed, based on the list of PLMNs supported by the AMF and the information received from the DU. The processor 221 may be configured to control the transceiver 223 to transmit, to the DU, the CAG control information.

According to various embodiments, the processor 221 may be configured to determine CAG control information informing at least one other PLMN for which a manual CAG selection on a CAG ID not included in the list of allowed CAG IDs of the wireless device is not allowed, based on the list of PLMNs supported by the AMF and the information received from the DU.

According to various embodiments, the processor 221 may be configured to control the transceiver 223 to transmit, to the AMF, the information informing whether to allow a manual CAG selection on a CAG ID not included in the list of allowed CAG IDs of the wireless device for each of the PLMNs. The CAG control information may be determined by the AMF based on the list of PLMNs supported by the AMF and the information, after transmitting the information to the AMF.

According to various embodiments, the processor 221 may be configured to generate system information comprising the CAG control information. The processor 221 may be configured to control the transceiver 223 to transmit the system information comprising the CAG control information to the DU.

According to various embodiments, the CAG control information may be transmitted to the DU via a F1AP SETUP RESPONSE message. The CAG control information may be encoded at the DU and broadcasted by the DU to wireless devices via system information. The system information may comprise at least one of a system information block type 1 (SIB1) or SIB10.

According to various embodiments, the CAG control information may be transmitted to the DU via a F1AP GNB CU CONFIGURATION UPDATE message.

According to various embodiments, the information may be received from the DU via a F1AP SETUP REQUEST message. The list of PLMNs supported by the AMF may be received from the AMF via a NGAP NG SETUP RESPONSE message.

Figure 11:
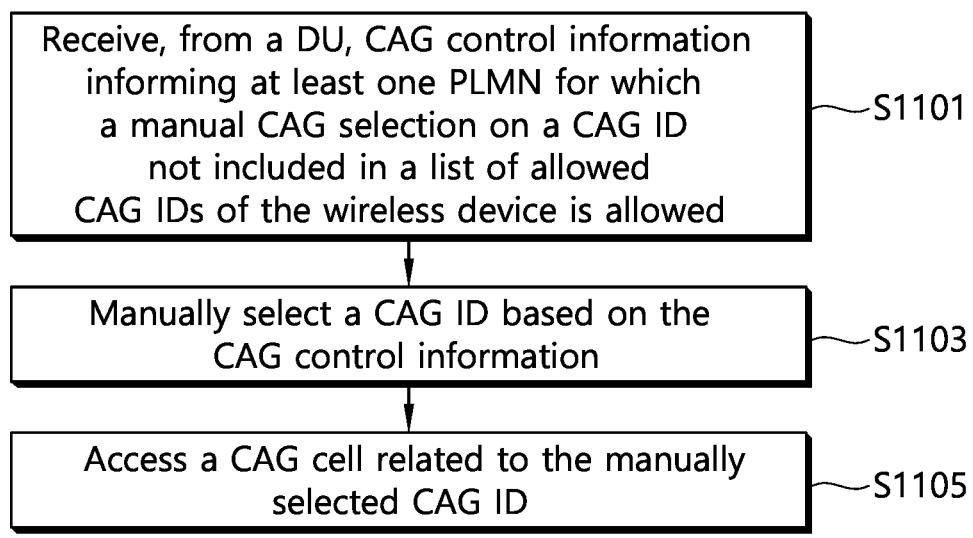
FIG. 11 shows an example of a method for accessing a CAG cell based on manual CAG selection control information according to an embodiment of the present disclosure.

FIG. 11 shows an example of a method for accessing a CAG cell based on manual CAG selection control information according to an embodiment of the present disclosure. Steps illustrated in FIG. 11 may be performed by a wireless device and/or a UE.

Referring to FIG. 11, in step S1101, the wireless device may receive, from a DU, CAG control information informing at least one PLMN for which a manual CAG selection on a CAG ID not included in a list of allowed CAG IDs of the wireless device is allowed. That is, the wireless device may receive, from the DU, manual CAG selection control information for the at least one PLMN indicating that a manual CAG selection on a CAG ID not included in a list of allowed CAG IDs of the wireless device is allowed for the at least one PLMN.

In step S1103, the wireless device may manually select a CAG ID based on the CAG control information.

In step S1105, the wireless device may access a CAG cell related to the manually selected CAG ID.

According to various embodiments, the CAG control information may be determined based on a list of PLMNs supported by an AMF and manual CAG selection control information configured in the DU.

According to various embodiments, the wireless device may manually select the CAG ID among all available CAG IDs based on that the CAG cell related to the CAG ID belongs to the at least one PLMN informed by the CAG information. The all available CAG IDs may comprise one or more CAG IDs included in the list of allowed CAG IDs of the wireless device, and one or more CAG IDs not included in the list of allowed CAG IDs of the wireless device. For example, the wireless device may manually select the CAG ID not included in the list of allowed CAG IDs of the wireless device.

According to various embodiments, the wireless device may manually select the CAG ID included in the list of allowed CAG IDs of the wireless device based on that the CAG cell related to the CAG ID does not belong to the at least one PLMN informed by the CAG control information.

According to various embodiments, the manual CAG selection control information may inform whether to allow a manual CAG selection on a CAG ID not included in a list of allowed CAG IDs of the wireless device for each of PLMNs.

In case the manual CAG selection control information for each PLMN is configured in 5th generation core (5GC) (e.g., AMF or UDM or PCF), the 5GC may indicate the manual CAG selection control information for each PLMN to the gNB-CU by using the NG Setup or gNB Configuration Update procedure. If the manual CAG selection control information is encoded at gNB-DU and broadcasted in SIB1 or SIB10 or new SIB, the gNB-CU may send the manual CAG selection control information for each PLMN to the gNB-DU. This case will be described in FIG. 12.

Figure 12:
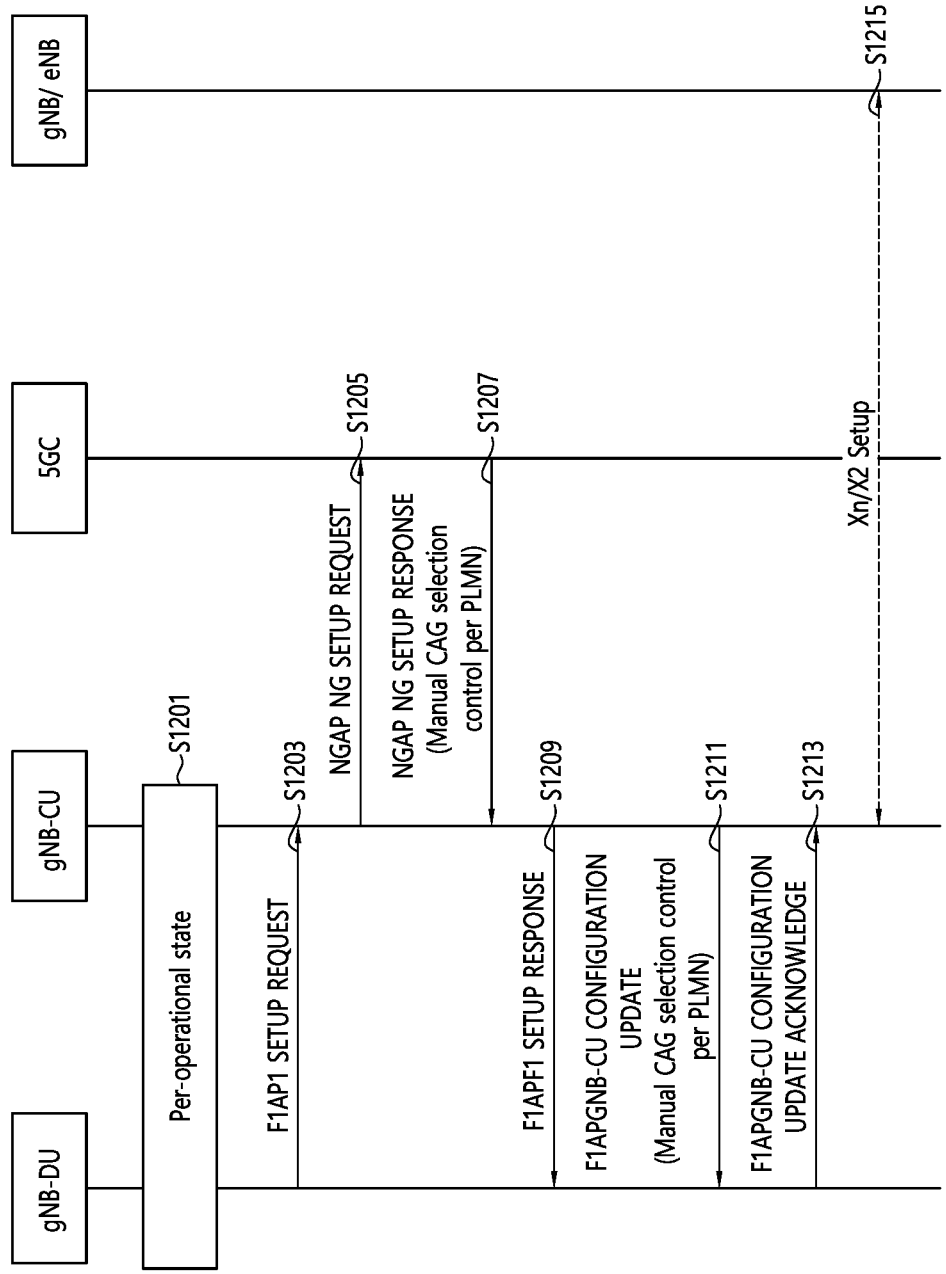
FIG. 12 shows a first example of a procedure for providing manual CAG selection control information for each PLMN according to an embodiment of the present disclosure.

FIG. 12 shows a first example of a procedure for providing manual CAG selection control information for each PLMN according to an embodiment of the present disclosure. The procedure may be related to F1 start up and cell activation if/when the manual CAG selection control information is configured in AMF or UDM.

Referring to FIG. 12, in step S1201, the gNB-DU and cells of the gNB-DU may be configured by operation, administration and management (OAM) in the F1 pre-operational state. The gNB-DU may have TNL connectivity toward the gNB-CU.

In step S1203, the gNB-DU may send an F1 SETUP REQUEST message to the gNB-CU including a list of cells that are configured and ready to be activated.

In step S1205, in NG-RAN, the gNB-CU may ensure the connectivity toward the core network. For this reason, the gNB-CU may send the NGAP NG SETUP REQUEST message or RAN CONFIGURATION UPDATE message to initiate either the NG Setup or the gNB Configuration Update procedure towards 5GC.

In step S1207, the AMF may respond with an NG SETUP RESPONSE message or the RAN CONFIGURATION UPDATE ACKNOWLEDGE message including the appropriate data.

If the manual CAG selection control information for each PLMN is configured in 5GC (e.g., AMF or UDM or PCF), the manual CAG selection control information may be contained in the NG SETUP RESPONSE message or the RAN CONFIGURATION UPDATE ACKNOWLEDGE message to indicate to the UE that the user should be presented with all the available CAG IDs or the user should be presented with only those CAG IDs of a PLMN that are available and are present in the UE's Allowed CAG list for the PLMN, by using the system information broadcasting.

In step S1209, the gNB-CU may send an F1 SETUP RESPONSE message to the gNB-DU that optionally includes a list of cells to be activated. The cells in the list of cells to be activated in F1 SETUP RESPONSE message may become active, while the cells not in the list may be inactive. The cells that are active may be Out-of-Service until the gNB-DU indicates that they are In-Service. The gNB-DU will initiate the gNB-DU Configuration Update procedure towards the gNB-CU and may indicate the cell(s) that are In-Service and/or the cell(s) that are Out-Of-Service. The gNB-DU may also indicate cell(s) to be deleted, in which case the gNB-CU removes the corresponding cell(s) information.

If the manual CAG selection control information for each PLMN should be broadcasted by the SIB (e.g. SIB2, SIB3, . . . ) owned by gNB-CU, the gNB-CU may update the gNB-CU System Information IE and then forward the gNB-CU System Information IE to the gNB-DU.

In step S1211, if the manual CAG selection control information for each PLMN should be encoded at gNB-DU and broadcasted by the SIB1 or SIB10 or new SIB, the gNB-CU may send a GNB CU CONFIGURATION UPDATE message containing the manual CAG selection control information for each PLMN.

Instead of a GNB CU CONFIGURATION UPDATE message, the manual CAG selection control information for each PLMN may be forwarded by using the F1AP F1 SETUP RESPONSE message in step S1209.

In step S1213, upon reception of the manual CAG selection control information for each PLMN, the gNB-DU may update the gNB-DU system Information IE based on the manual CAG selection control information and then respond with a GNB CU CONFIGURATION UPDATE ACKNOWLEDGE message to gNB-CU.

In step S1215, the gNB-CU may initiate either the Xn Setup towards a neighbour NG-RAN node or the EN-DC X2 Setup procedure towards a neighbour eNB.

According to an embodiment in FIG. 12, the 5GC may be able to determine whether the user selection of CAG cells that are not included in the Allowed CAG list is allowed in a specific PLMN. According to the system information for manual CAG selection control information, the UE can decide whether to access the CAG cells that are not included in the Allowed CAG list.

In case the manual CAG selection control information for each PLMN is owned/configured/encoded in gNB-DU, the gNB-DU forwards the manual CAG selection control information for each PLMN to the gNB-CU. Then, gNB-CU may determine the final manual CAG selection control information for each PLMN based on the information from the gNB-DU and the PLMN support list from the AMF. If the manual CAG selection control information is encoded at gNB-DU and broadcasted in SIB1 or SIB10 or new SIB, the gNB-CU may send the manual CAG selection control information to the gNB-DU. This case will be described in FIG. 13.

Figure 13:
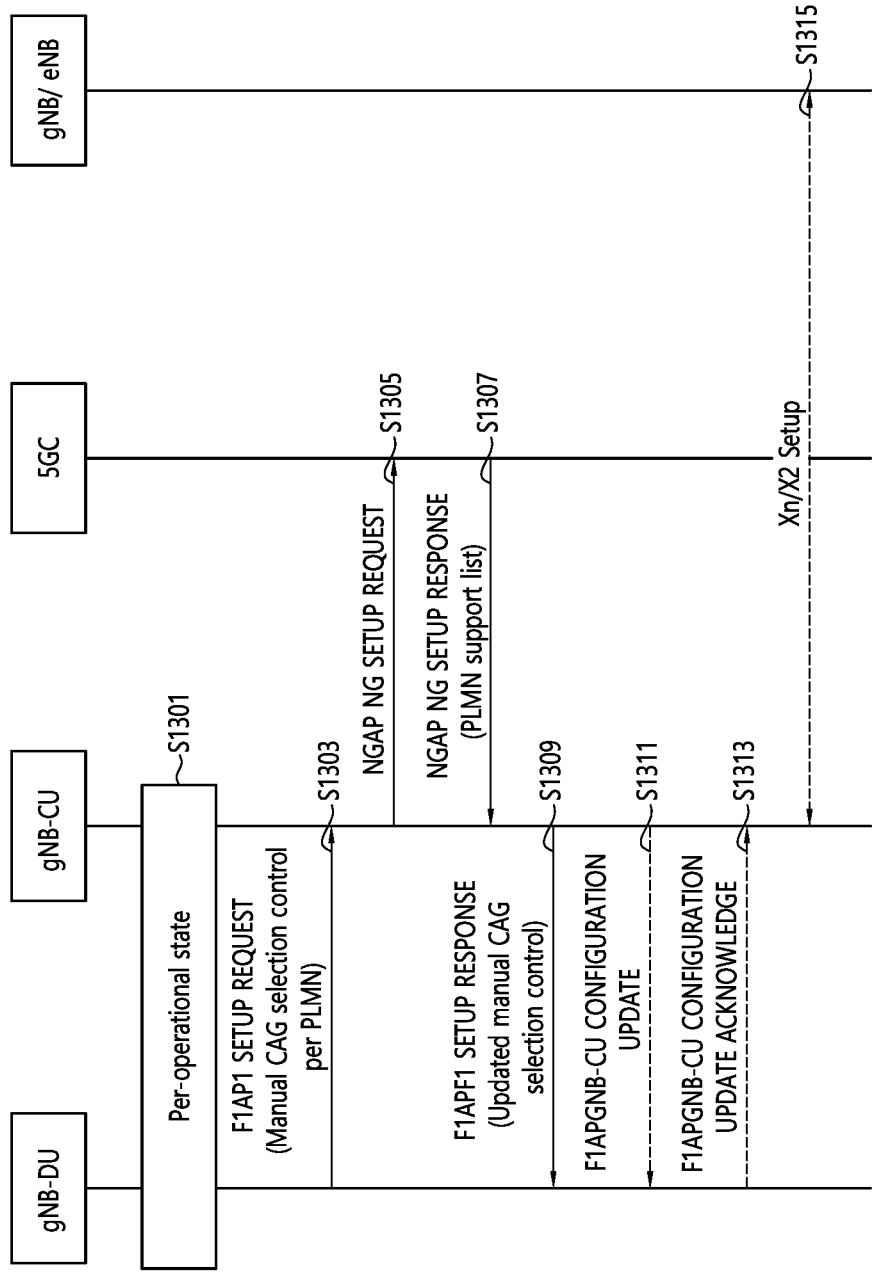
FIG. 13 shows a second example of a procedure for providing manual CAG selection control information for each PLMN according to an embodiment of the present disclosure.

FIG. 13 shows a second example of a procedure for providing manual CAG selection control information for each PLMN according to an embodiment of the present disclosure. The procedure may be related to F1 start up and cell activation when the manual CAG selection control information for each PLMN is configured in gNB-DU.

Referring to FIG. 13, in step S1301, the gNB-DU and cells of the gNB-DU may be configured by OAM in the F1 pre-operational state. The gNB-DU may have4 TNL connectivity toward the gNB-CU.

In step S1303, the gNB-DU may send an F1 SETUP REQUEST message to the gNB-CU including a list of cells that are configured and ready to be activated. If the manual CAG selection control information for each PLMN is owned/configured/encoded in gNB-DU, the manual CAG selection control information may be contained in the F1 SETUP REQUEST message to indicate to the UE that the user should be presented with all the available CAG IDs or the user should be presented with only those CAG IDs of a PLMN that are available and are present in the UE's Allowed CAG list for the PLMN by using the system information broadcasting.

In step S1305, in NG-RAN, the gNB-CU may ensure the connectivity toward the core network. For this reason, the gNB-CU may send the NGAP NG SETUP REQUEST message or RAN CONFIGURATION UPDATE message to initiate either the NG Setup or the gNB Configuration Update procedure towards 5GC.

In step S1307, the AMF may responds with an NG SETUP RESPONSE message or the RAN CONFIGURATION UPDATE ACKNOWLEDGE message including the appropriate data.

In step S1309, the gNB-CU may send an F1 SETUP RESPONSE message to the gNB-DU that optionally includes a list of cells to be activated. The cells in the list of cells to be activated in F1 SETUP RESPONSE message may become active, while the cells not in the list may be inactive. The cells that are active may be Out-of-Service until the gNB-DU indicates that they are In-Service. The gNB-DU will initiate the gNB-DU Configuration Update procedure towards the gNB-CU and indicate the cell(s) that are In-Service and/or the cell(s) that are Out-Of-Service. The gNB-DU may also indicate cell(s) to be deleted, in which case the gNB-CU removes the corresponding cell(s) information.

Based on the manual CAG selection control information for each PLMN in step S1303 and the PLMN support list received in step S1307, the gNB-CU may finally determine which PLMN is allowed to control the access of the user selection of CAG cells that are not included in the Allowed CAG list.

If the updated Manual CAG selection control information should be broadcasted by the SIB (e.g. SIB2, SIB3, . . . ) owned by gNB-CU, the gNB-CU may update the gNB-CU System Information IE and then forward the gNB-CU System Information IE to the gNB-DU. If the updated Manual CAG selection control information should be encoded at gNB-DU and broadcasted by the SIB1 or SIB10 or new SIB, the gNB-CU may send a F1AP F1 SETUP RESPONSE message containing the updated Manual CAG selection control information. Upon reception of the updated Manual CAG selection control information, the gNB-DU may update the gNB-DU System Information IE based on the updated Manual CAG selection control information.

Instead of a F1 SETUP RESPONSE message, the updated Manual CAG selection control information may be forwarded by using the F1AP GNB CU CONFIGURATION UPDATE message in step S1311.

In step S1311, the gNB-CU may send a GNB CU CONFIGURATION UPDATE message to the gNB-DU that optionally includes a list of cells to be activated, for example, in case that these cells were not activated using the F1 SETUP RESPONSE message.

In step S1313, the gNB-DU may reply with a GNB CU CONFIGURATION UPDATE ACKNOWLEDGE message that optionally includes a list of cells that failed to be activated. The gNB-CU may regard all Active cells as being Out-Of-Service until the gNB-DU indicates that they are In-Service.

In step S1315, the gNB-CU may initiate either the Xn Setup towards a neighbour NG-RAN node or the EN-DC X2 Setup procedure towards a neighbour eNB.

Figure 14:
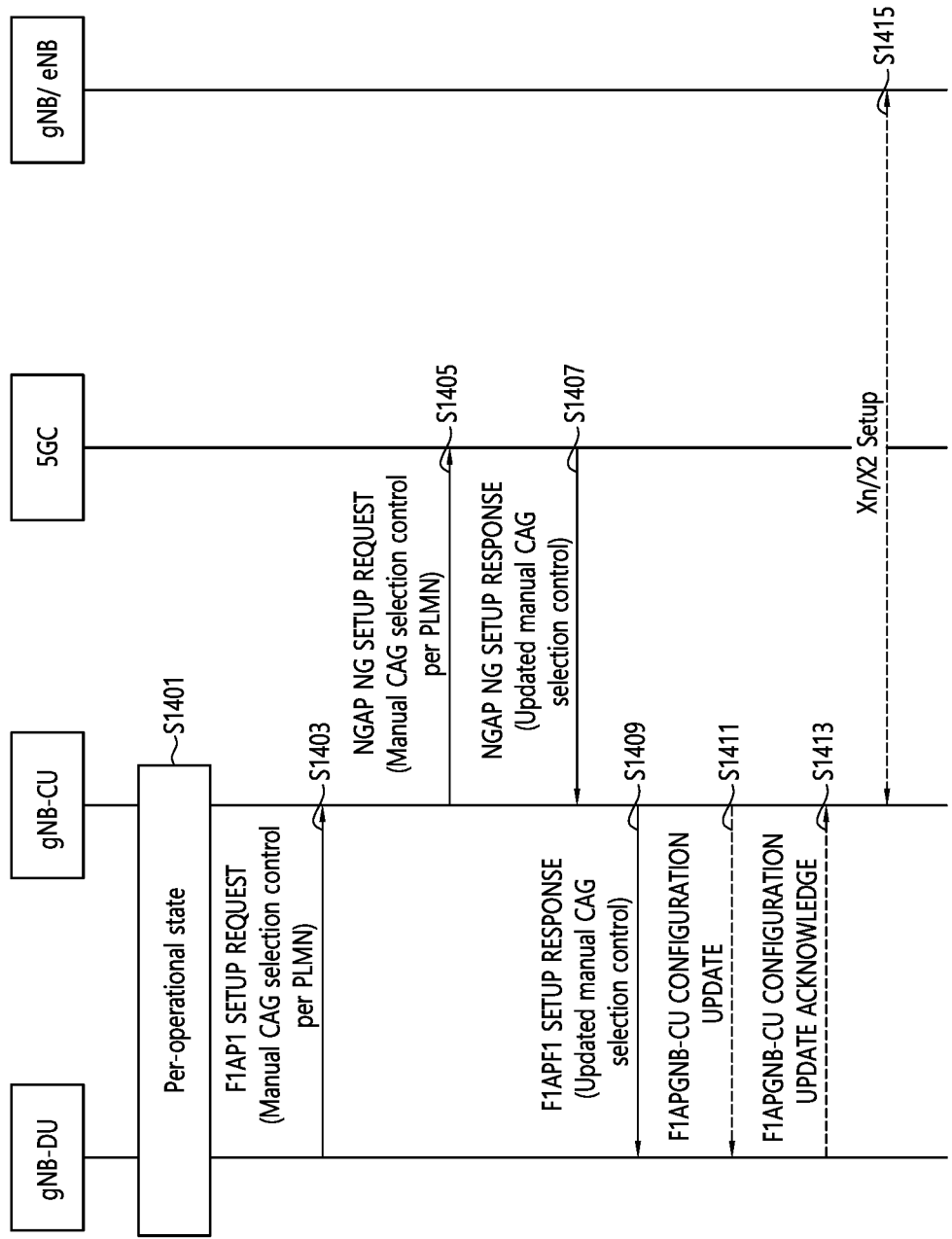
FIG. 14 shows a third example of a procedure for providing manual CAG selection control information for each PLMN according to an embodiment of the present disclosure.

FIG. 14 shows a third example of a procedure for providing manual CAG selection control information for each PLMN according to an embodiment of the present disclosure. The procedure may be related to F1 start up and cell activation when manual CAG selection control information for each PLMN is configured in the gNB-DU.

Referring to FIG. 14, in step S1401, the gNB-DU and cells of the gNB-DU may be configured by OAM in the F1 pre-operational state. The gNB-DU may have TNL connectivity toward the gNB-CU.

In step S1403, the gNB-DU may send an F1 SETUP REQUEST message to the gNB-CU including a list of cells that are configured and ready to be activated. If the manual CAG selection control information for each PLMN is owned/configured/encoded in gNB-DU, the manual CAG selection control information may be contained in the F1 SETUP REQUEST message to indicate to the UE that the user should be presented with all the available CAG IDs or the user should be presented with only those CAG IDs of a PLMN that are available and are present in the UE's Allowed CAG list for the PLMN by using the system information broadcasting.

In step S1405, in NG-RAN, the gNB-CU may ensure the connectivity toward the core network. For this reason, the gNB-CU may send the NGAP NG SETUP REQUEST message or RAN CONFIGURATION UPDATE message to initiate either the NG Setup or the gNB Configuration Update procedure towards 5GC. The NGAP NG SETUP REQUEST message or RAN CONFIGURATION UPDATE message may contain the manual CAG selection control information for each PLMN received in step S1403.

In step S1407, the AMF may respond with an NG SETUP RESPONSE message or the RAN CONFIGURATION UPDATE ACKNOWLEDGE message including the appropriate data.

The AMF may finally determine manual CAG selection control information indicating which PLMN is allowed to control the access of the user selection of CAG cells that are not included in the Allowed CAG list, and then send the manual CAG selection control information to the gNB-CU by using the NG SETUP RESPONSE message or the RAN CONFIGURATION UPDATE ACKNOWLEDGE message.

In step S1409, the gNB-CU may send an F1 SETUP RESPONSE message to the gNB-DU that optionally includes a list of cells to be activated. The cells in the list of cells to be activated in F1 SETUP RESPONSE message may become active, while the cells not in the list are inactive. The cells that are active may be Out-of-Service until the gNB-DU indicates that they are In-Service. The gNB-DU will initiate the gNB-DU Configuration Update procedure towards the gNB-CU and indicate the cell(s) that are In-Service and/or the cell(s) that are Out-Of-Service. The gNB-DU may also indicate cell(s) to be deleted, in which case the gNB-CU removes the corresponding cell(s) information.

If the updated manual CAG selection control information should be broadcasted by the SIB (e.g. SIB2, SIB3, . . . ) owned by gNB-CU, the gNB-CU may update the gNB-CU System Information IE based on the updated manual CAG selection control information and then forwards the gNB-CU System Information IE to the gNB-DU. If the updated Manual CAG selection control information should be encoded at gNB-DU and broadcasted by the SIB1 or SIB10 or new SIB, the gNB-CU may send a F1AP F1 SETUP RESPONSE message containing the updated manual CAG selection control information. Upon reception of the updated Manual CAG selection control information, the gNB-DU may update the gNB-DU System Information IE based on the updated Manual CAG selection control information.

Instead of a F1 SETUP RESPONSE message, the updated Manual CAG selection control information may be forwarded by using the F1AP GNB CU CONFIGURATION UPDATE message in step S1411.

In step S1411, the gNB-CU may send a GNB CU CONFIGURATION UPDATE message to the gNB-DU that optionally includes a list of cells to be activated, for example, in case that these cells were not activated using the F1 SETUP RESPONSE message.

In step S1413, the gNB-DU may reply with a GNB CU CONFIGURATION UPDATE ACKNOWLEDGE message that optionally includes a list of cells that failed to be activated. The gNB-CU may regard all Active cells as Out-Of-Service until the gNB-DU indicates that they are In-Service.

In step S1415, the gNB-CU may initiate either the Xn Setup towards a neighbour NG-RAN node or the EN-DC X2 Setup procedure towards a neighbour eNB.

According to embodiments in FIGS. 13 and 14, the network may be able to determine whether the user selection of CAG cells that are not included in the Allowed CAG list is allowed in a specific PLMN. According to the system information for manual CAG selection control information, the UE can decide whether to access the CAG cells that are not included in the Allowed CAG list.

In case the manual CAG selection control information for each PLMN is configured in gNB-CU, the gNB-CU may determine the final manual CAG selection control information based on the information configured in the gNB-CU and the PLMN support list from the AMF. If the manual CAG selection control information is encoded at gNB-DU and broadcasted in SIB1 or SIB10 or new SIB, the gNB-CU may send the manual CAG selection control information to the gNB-DU.

Figure 15:
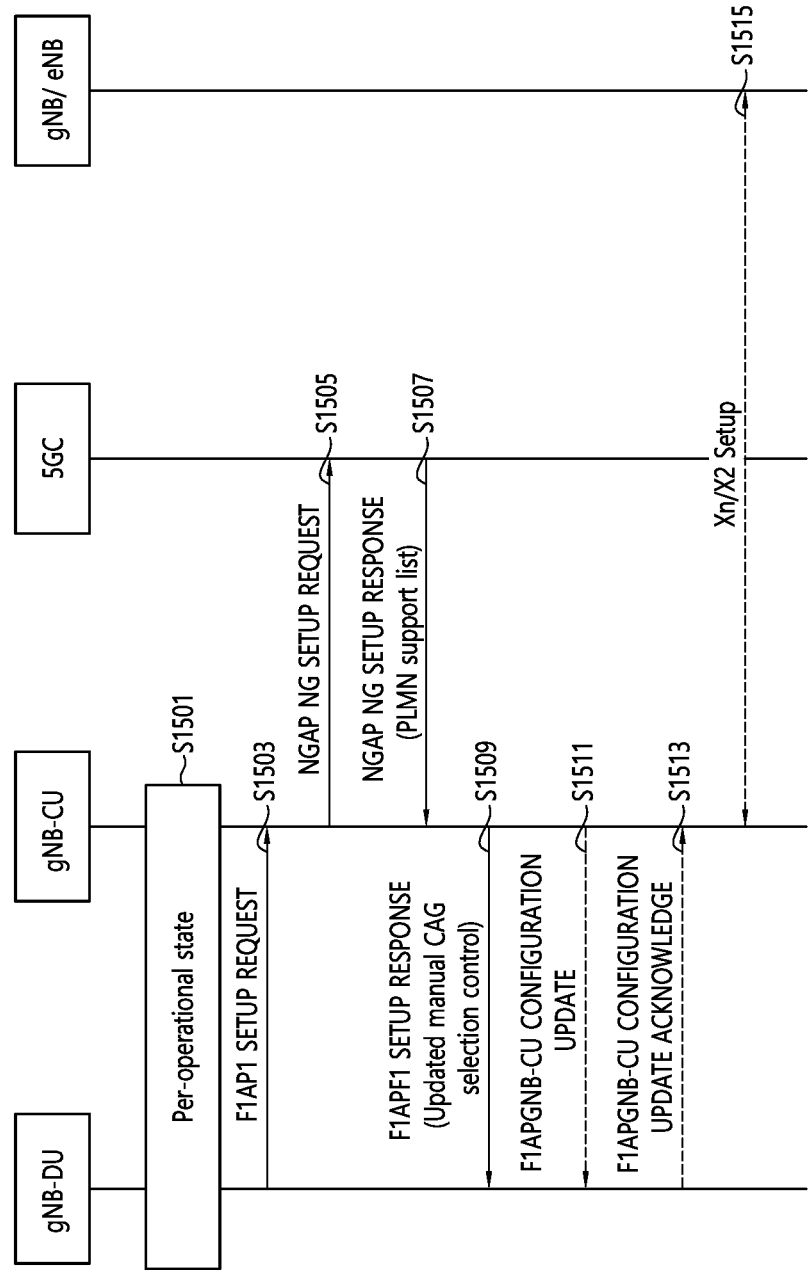
FIG. 15 shows a fourth example of a procedure for providing manual CAG selection control information for each PLMN according to an embodiment of the present disclosure.

FIG. 15 shows a fourth example of a procedure for providing manual CAG selection control information for each PLMN according to an embodiment of the present disclosure. The procedure may be related to F1 start up and cell activation when manual CAG selection control information is configured in gNB-CU.

Referring to FIG. 15, in step S1501, the gNB-DU and cells of the gNB-CU may be configured by OAM in the F1 pre-operational state. The gNB-DU may have TNL connectivity toward the gNB-CU.

In step S1503, the gNB-DU may send an F1 SETUP REQUEST message to the gNB-CU including a list of cells that are configured and ready to be activated.

In step S1505, in NG-RAN, the gNB-CU may ensure the connectivity toward the core network. For this reason, the gNB-CU may send the NGAP NG SETUP REQUEST message or RAN CONFIGURATION UPDATE message to initiate either the NG Setup or the gNB Configuration Update procedure towards 5GC.

In step S1507, the AMF may respond with an NG SETUP RESPONSE message or the RAN CONFIGURATION UPDATE ACKNOWLEDGE message including the appropriate data. The NG SETUP RESPONSE message or the RAN CONFIGURATION UPDATE ACKNOWLEDGE message may include a PLMN support list.

In step S1509, the gNB-CU may send an F1 SETUP RESPONSE message to the gNB-DU that optionally includes a list of cells to be activated. The cells in the list of cells to be activated in F1 SETUP RESPONSE message may become active, while the cells not in the list may be inactive. The cells that are active may be Out-of-Service until the gNB-DU indicates that they are In-Service. The gNB-DU will initiate the gNB-DU Configuration Update procedure towards the gNB-CU and indicate the cell(s) that are In-Service and/or the cell(s) that are Out-Of-Service. The gNB-DU may also indicate cell(s) to be deleted, in which case the gNB-CU removes the corresponding cell(s) information.

If the manual CAG selection control information for each PLMN is configured in gNB-CU to indicate to the UE that the user should be presented with all the available CAG IDs or the user should be presented with only those CAG IDs of a PLMN that are available and are present in the UE's Allowed CAG list for the PLMN by using the system information broadcasting, the gNB-CU may finally determine which PLMN is allowed to control the access of the user selection of CAG cells that are not included in the Allowed CAG list based on the manual CAG selection control information in gNB-CU and the PLMN support list received in step S1507.

If the updated manual CAG selection control information should be broadcasted by the SIB (e.g. SIB2, SIB3, . . . ) owned by gNB-CU, the gNB-CU may update the gNB-CU System Information IE and then forwards the gNB-CU System Information IE to the gNB-DU. If the updated Manual CAG selection control information should be encoded at gNB-DU and broadcasted by the SIB1 or SIB10 or new SIB, the gNB-CU may send a F1AP F1 SETUP RESPONSE message containing the updated Manual CAG selection control information. Upon reception of the updated Manual CAG selection control information, the gNB-DU may update the gNB-DU System Information IE based on the updated Manual CAG selection control information.

Instead of a F1 SETUP RESPONSE message, the updated Manual CAG selection control information may be forwarded by using the F1AP GNB CU CONFIGURATION UPDATE message in step S1511.

In step S1511, the gNB-CU may send a GNB CU CONFIGURATION UPDATE message to the gNB-DU that optionally includes a list of cells to be activated, for example, in case that these cells were not activated using the F1 SETUP RESPONSE message.

In step S1513, the gNB-DU may reply with a GNB CU CONFIGURATION UPDATE ACKNOWLEDGE message that optionally includes a list of cells that failed to be activated. The gNB-CU may regard all Active cells as Out-Of-Service until the gNB-DU indicates that they are In-Service.

In step S1515, the gNB-CU may initiate either the Xn Setup towards a neighbour NG-RAN node or the EN-DC X2 Setup procedure towards a neighbour eNB.

According to an embodiment in FIG. 15, the network may be able to determine whether the user selection of CAG cells that are not included in the Allowed CAG list is allowed in a specific PLMN. According to the system information for manual CAG selection control information, the UE can decide whether to access the CAG cells that are not included in the Allowed CAG list.

In case the manual CAG selection control information for each PLMN is configured in gNB-DU or gNB-CU, the gNB-DU or gNB-CU may inform the AMF of an indication indicating whether the user can manually select a non-allowed CAG-ID (i.e., a CAG ID that is not included in an allowed CAG list of the UE) during the UE initial access. The indication may enable the AMF to allow the UE access when the CAG ID list supported by the UE access cell is part of the Allowed CAG list included in the subscription.

Figure 16:
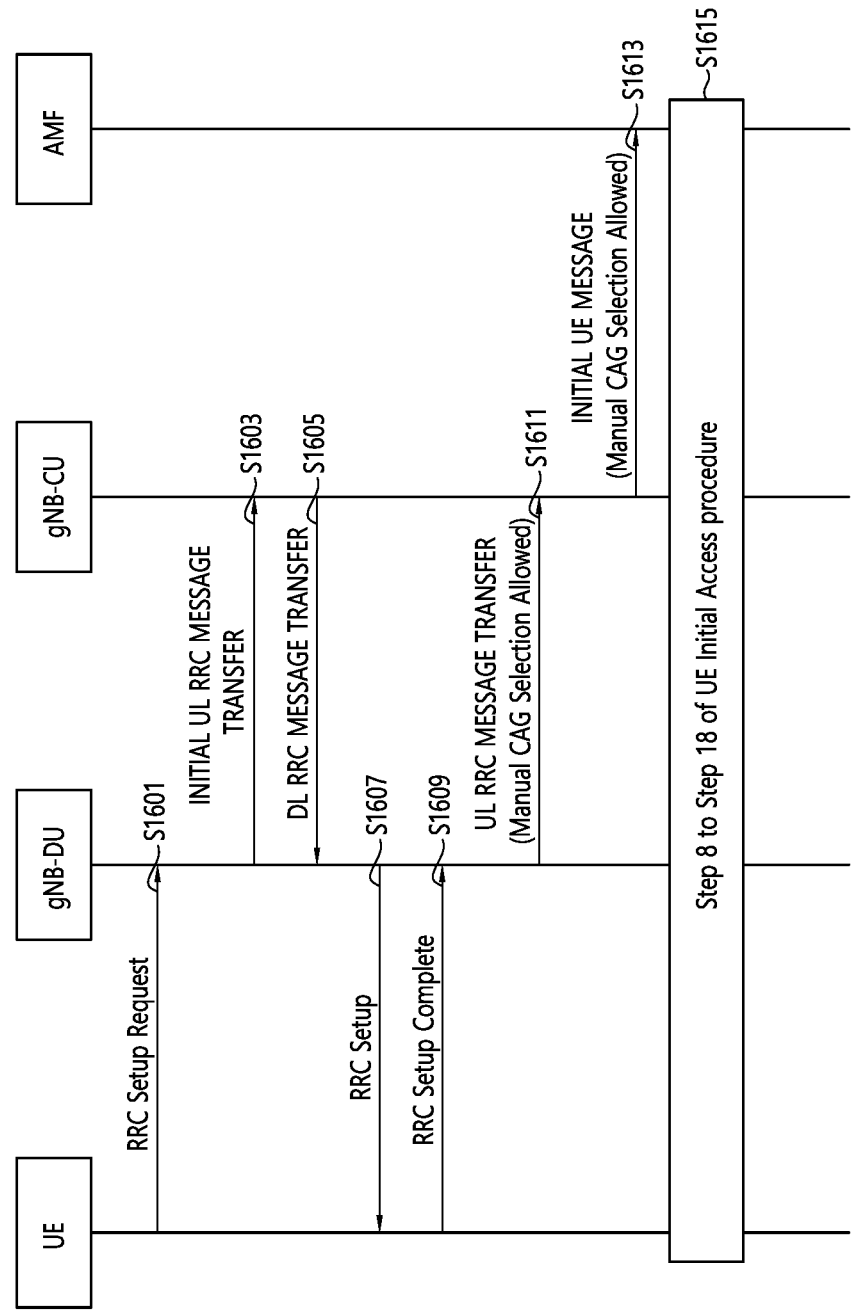
FIG. 16 shows an example of a procedure for UE initial access when manual CAG selection control information is configured in gNB-DU or gNB-CU according to an embodiment of the present disclosure.

FIG. 16 shows an example of a procedure for UE initial access when manual CAG selection control information is configured in gNB-DU or gNB-CU according to an embodiment of the present disclosure.

Referring to FIG. 16, in step S1601, the UE may send an RRC setup request message to the gNB-DU.

In step S1603, the gNB-DU may include the RRC setup request message and, if the UE is admitted, the corresponding low layer configuration for the UE in the INITIAL UL RRC MESSAGE TRANSFER message and transfer the INITIAL UL RRC MESSAGE TRANSFER message to the gNB-CU. The INITIAL UL RRC MESSAGE TRANSFER message may include the C-RNTI allocated by the gNB-DU.

In step S1605, the gNB-CU may allocate a gNB-CU UE F1AP ID for the UE and generate a RRC Setup message towards UE. The RRC message may be encapsulated in the DL RRC MESSAGE TRANSFER message.

In step S1607, the gNB-DU may send the RRC Setup message to the UE.

In step S1609, the UE may send the RRC Setup Complete message to the gNB-DU.

In step S1611, the gNB-DU may encapsulate the RRC message in the UL RRC MESSAGE TRANSFER message and send the UL RRC MESSAGE TRANSFER message to the gNB-CU.

If the manual CAG selection control information for each PLMN is configured in gNB-DU to indicate to the UE that the user should be presented with all the available CAG IDs or the user should be presented with only those CAG IDs of a PLMN that are available and are present in the UE's Allowed CAG list for the PLMN by using the system information broadcasting, the gNB-DU also may include the manual CAG selection allowed indication (or, manual CAG selection control information) to indicate to the gNB-CU that the user can manually select a non-allowed CAG-ID. The manual CAG Selection allowed indication may be sent to the gNB-CU in step S1603.

In step S1613, the gNB-CU may send the INITIAL UE MESSAGE message to the AMF.

If the manual CAG selection control information for each PLMN is configured in gNB-CU or the manual CAG Selection Allowed indication is received from the gNB-DU, the gNB-CU may also include the Manual CAG Selection Allowed indication into the INITIAL UE MESSAGE message to indicate that the user can manually select a non-allowed CAG-ID. The Manual CAG Selection Allowed indication may enable the AMF to allow the UE access when the CAG ID list supported by the UE access cell is part of the Allowed CAG list included in the subscription.

In step S1615, the UE initial access procedure may be performed.

According to the system information for manual CAG selection control information, the UE can decide whether to access the CAG cells that are not included in the Allowed CAG list. The AMF can allow the UE access when the CAG ID list supported by the UE access cell is part of the Allowed CAG list included in the subscription.

Figure 17:
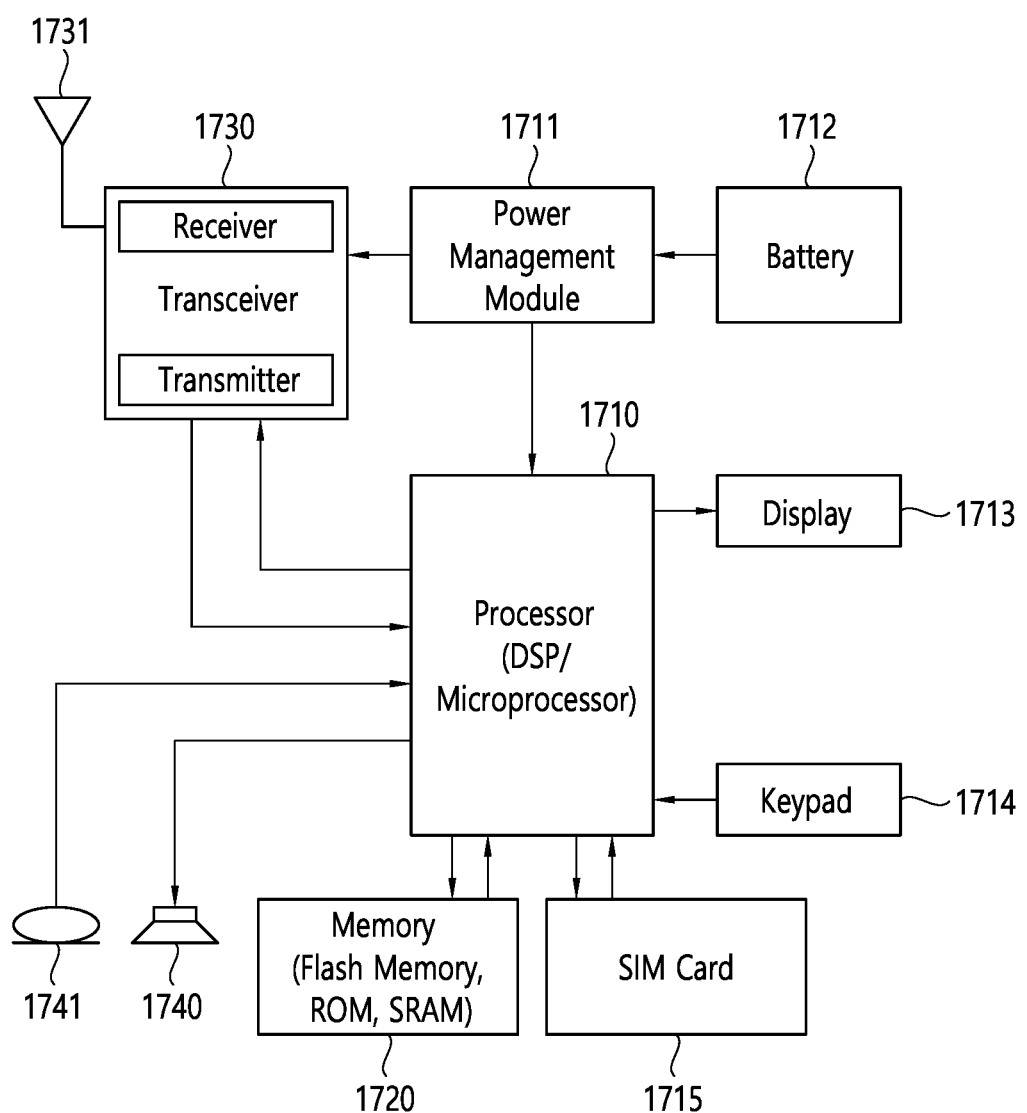
FIG. 17 shows a UE to implement an embodiment of the present disclosure.

FIG. 17 shows a UE to implement an embodiment of the present disclosure. The present disclosure described above for UE side may be applied to this embodiment. The UE in FIG. 17 may be an example of first device 217 as illustrated in FIG. 2.

A UE includes a processor 1710 (i.e., processor 211), a power management module 1711, a battery 1712, a display 1713, a keypad 1714, a subscriber identification module (SIM) card 1715, a memory 1720 (i.e., memory 212), a transceiver 1730 (i.e., transceiver 213), one or more antennas 1731, a speaker 1740, and a microphone 1741.

The processor 1710 may be configured to implement proposed functions, procedures and/or methods described in this description. Layers of the radio interface protocol may be implemented in the processor 1710. The processor 1710 may include application-specific integrated circuit (ASIC), other chipset, logic circuit and/or data processing device. The processor 1710 may be an application processor (AP). The processor 1710 may include at least one of a digital signal processor (DSP), a central processing unit (CPU), a graphics processing unit (GPU), a modem (modulator and demodulator). An example of the processor 1710 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1710 may be configured to, or configured to control the transceiver 1730 to implement steps performed by the UE and/or the wireless device throughout the disclosure.

The power management module 1711 manages power for the processor 1710 and/or the transceiver 1730. The battery 1712 supplies power to the power management module 1711. The display 1713 outputs results processed by the processor 1710. The keypad 1714 receives inputs to be used by the processor 1710. The keypad 1714 may be shown on the display 1713. The SIM card 1715 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1720 is operatively coupled with the processor 1710 and stores a variety of information to operate the processor 1710. The memory 1720 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1720 and executed by the processor 1710. The memory 1720 can be implemented within the processor 1710 or external to the processor 1710 in which case those can be communicatively coupled to the processor 1710 via various means as is known in the art.

The transceiver 1730 is operatively coupled with the processor 1710, and transmits and/or receives a radio signal. The transceiver 1730 includes a transmitter and a receiver. The transceiver 1730 may include baseband circuitry to process radio frequency signals. The transceiver 1730 controls the one or more antennas 1731 to transmit and/or receive a radio signal.

The speaker 1740 outputs sound-related results processed by the processor 1710. The microphone 1741 receives sound-related inputs to be used by the processor 1710.

According to various embodiments, the processor 1710 may be configured to, or configured to control the transceiver 1730 to implement steps performed by the UE and/or the wireless device throughout the disclosure. For example, the processor 1710 may configured to control the transceiver 1730 to receive, from a DU, CAG control information informing at least one PLMN for which a manual CAG selection on a CAG ID not included in a list of allowed CAG IDs of the wireless device is allowed. The processor 1710 may configured to manually select a CAG ID based on the CAG control information. The processor 1710 may configured to access a CAG cell related to the manually selected CAG ID.

According to various embodiments, the CAG control information may be determined based on a list of PLMNs supported by an AMF and manual CAG selection control information configured in the DU.

According to various embodiments, the processor 1710 may configured to manually select the CAG ID among all available CAG IDs based on that the CAG cell related to the CAG ID belongs to the at least one PLMN informed by the CAG information. The all available CAG IDs may comprise one or more CAG IDs included in the list of allowed CAG IDs of the wireless device, and one or more CAG IDs not included in the list of allowed CAG IDs of the wireless device. For example, the processor 1710 may configured to manually select the CAG ID not included in the list of allowed CAG IDs of the wireless device.

According to various embodiments, the processor 1710 may configured to may manually select the CAG ID included in the list of allowed CAG IDs of the wireless device based on that the CAG cell related to the CAG ID does not belong to the at least one PLMN informed by the CAG control information.

According to various embodiments, the manual CAG selection control information may inform whether to allow a manual CAG selection on a CAG ID not included in a list of allowed CAG IDs of the wireless device for each of PLMNs.

Figure 18:
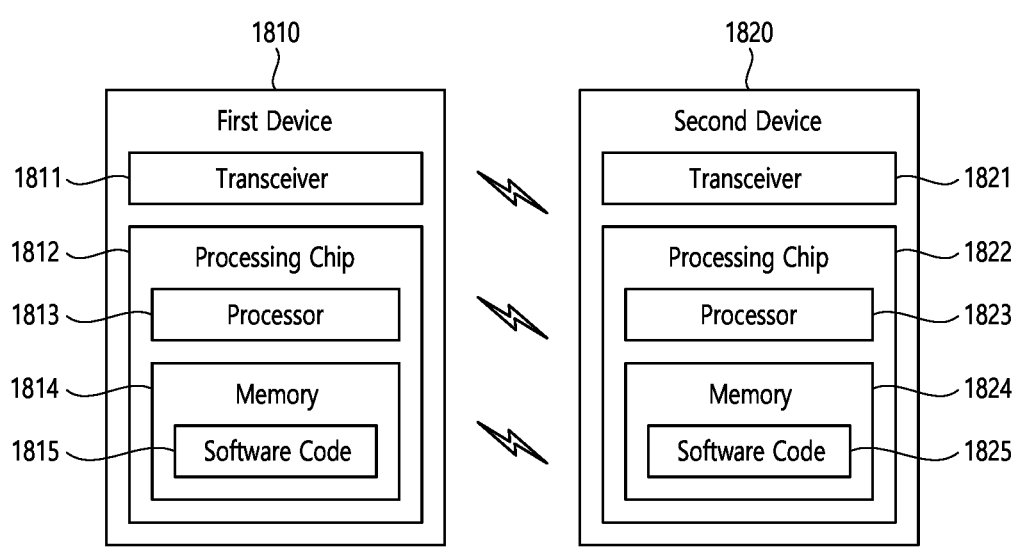
FIG. 18 shows another example of a wireless communication system to which the technical features of the present disclosure can be applied.

FIG. 18 shows another example of a wireless communication system to which the technical features of the present disclosure can be applied.

Referring to FIG. 18, the wireless communication system may include a first device 1810 (i.e., first device 210) and a second device 1820 (i.e., second device 220).

The first device 1810 may include at least one transceiver, such as a transceiver 1811, and at least one processing chip, such as a processing chip 1812. The processing chip 1812 may include at least one processor, such a processor 1813, and at least one memory, such as a memory 1814. The memory may be operably connectable to the processor 1813. The memory 1814 may store various types of information and/or instructions. The memory 1814 may store a software code 1815 which implements instructions that, when executed by the processor 1813, perform operations of the first device 910 described throughout the disclosure. For example, the software code 1815 may implement instructions that, when executed by the processor 1813, perform the functions, procedures, and/or methods of the first device 1810 described throughout the disclosure. For example, the software code 1815 may control the processor 1813 to perform one or more protocols. For example, the software code 1815 may control the processor 1813 to perform one or more layers of the radio interface protocol.

The second device 1820 may include at least one transceiver, such as a transceiver 1821, and at least one processing chip, such as a processing chip 1822. The processing chip 1822 may include at least one processor, such a processor 1823, and at least one memory, such as a memory 1824. The memory may be operably connectable to the processor 1823. The memory 1824 may store various types of information and/or instructions. The memory 1824 may store a software code 1825 which implements instructions that, when executed by the processor 1823, perform operations of the second device 1820 described throughout the disclosure. For example, the software code 1825 may implement instructions that, when executed by the processor 1823, perform the functions, procedures, and/or methods of the second device 1820 described throughout the disclosure. For example, the software code 1825 may control the processor 1823 to perform one or more protocols. For example, the software code 1825 may control the processor 1823 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 19:
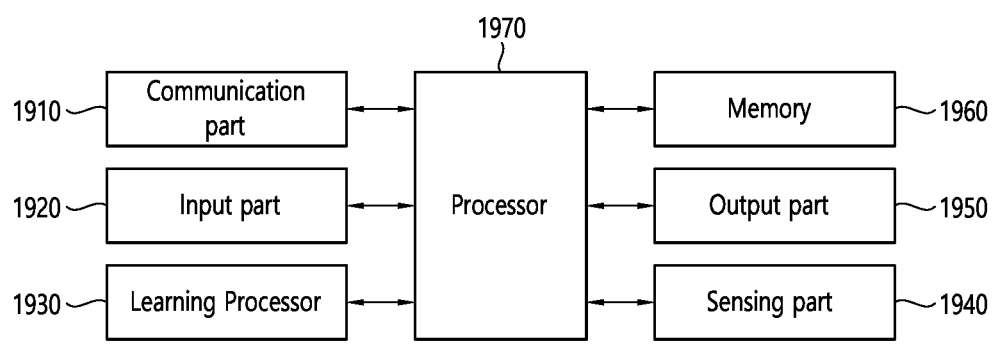
FIG. 19 shows an example of an AI device to which the technical features of the present disclosure can be applied.

FIG. 19 shows an example of an AI device to which the technical features of the present disclosure can be applied.

The AI device 1900 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 19, the AI device 1900 may include a communication part 1910, an input part 1920, a learning processor 1930, a sensing part 1940, an output part 1950, a memory 1960, and a processor 1970.

The communication part 1910 can transmit and/or receive data to and/or from external devices such as the AI devices and the AI server using wire and/or wireless communication technology. For example, the communication part 1910 can transmit and/or receive sensor information, a user input, a learning model, and a control signal with external devices. The communication technology used by the communication part 1910 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1920 can acquire various kinds of data. The input part 1920 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1920 can acquire input data to be used when acquiring an output using learning data and a learning model for model learning. The input part 1920 may obtain raw input data, in which case the processor 1970 or the learning processor 1930 may extract input features by preprocessing the input data.

The learning processor 1930 may learn a model composed of an ANN using learning data. The learned ANN can be referred to as a learning model. The learning model can be used to infer result values for new input data rather than learning data, and the inferred values can be used as a basis for determining which actions to perform. The learning processor 1930 may perform AI processing together with the learning processor of the AI server. The learning processor 1930 may include a memory integrated and/or implemented in the AI device 1900. Alternatively, the learning processor 1930 may be implemented using the memory 1960, an external memory directly coupled to the AI device 1900, and/or a memory maintained in an external device.

The sensing part 1940 may acquire at least one of internal information of the AI device 1900, environment information of the AI device 1900, and/or the user information using various sensors. The sensors included in the sensing part 1940 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1950 may generate an output related to visual, auditory, tactile, etc. The output part 1950 may include a display unit for outputting visual information, a speaker for outputting auditory information, and/or a haptic module for outputting tactile information.

The memory 1960 may store data that supports various functions of the AI device 1900. For example, the memory 1960 may store input data acquired by the input part 1920, learning data, a learning model, a learning history, etc.

The processor 1970 may determine at least one executable operation of the AI device 1900 based on information determined and/or generated using a data analysis algorithm and/or a machine learning algorithm. The processor 1970 may then control the components of the AI device 1900 to perform the determined operation. The processor 1970 may request, retrieve, receive, and/or utilize data in the learning processor 1930 and/or the memory 1960, and may control the components of the AI device 1900 to execute the predicted operation and/or the operation determined to be desirable among the at least one executable operation. The processor 1970 may generate a control signal for controlling the external device, and may transmit the generated control signal to the external device, when the external device needs to be linked to perform the determined operation. The processor 1970 may obtain the intention information for the user input and determine the user's requirements based on the obtained intention information. The processor 1970 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1930 and/or learned by the learning processor of the AI server, and/or learned by their distributed processing. The processor 1970 may collect history information including the operation contents of the AI device 1900 and/or the user's feedback on the operation, etc. The processor 1970 may store the collected history information in the memory 1960 and/or the learning processor 1930, and/or transmit to an external device such as the AI server. The collected history information can be used to update the learning model. The processor 1970 may control at least some of the components of AI device 1900 to drive an application program stored in memory 1960. Furthermore, the processor 1970 may operate two or more of the components included in the AI device 1900 in combination with each other for driving the application program.

Figure 20:
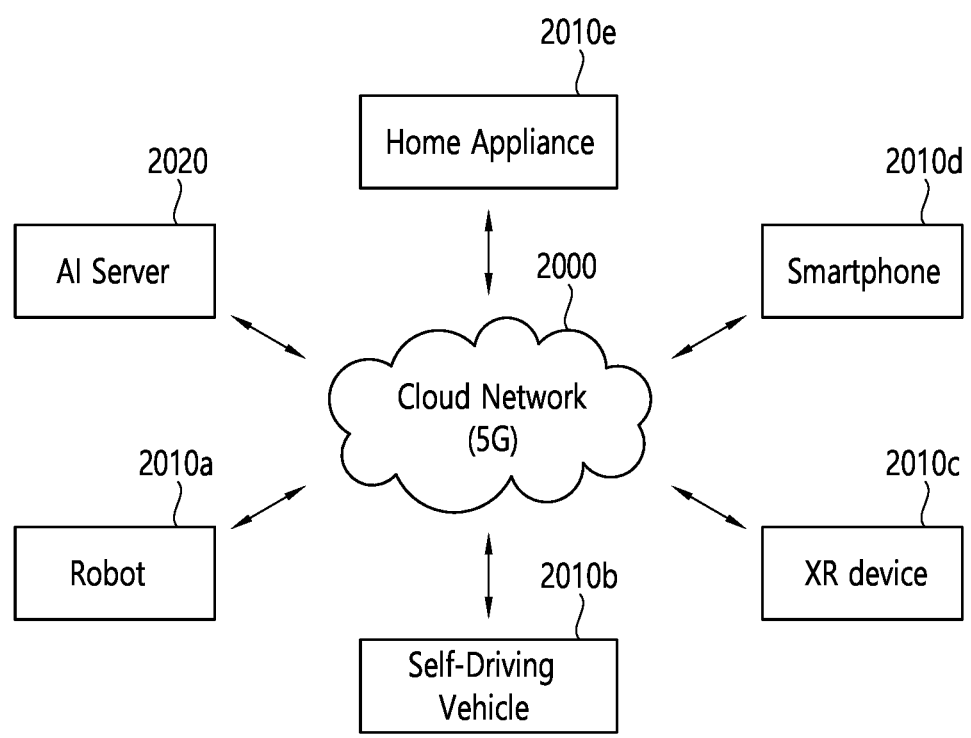
FIG. 20 shows an example of an AI system to which the technical features of the present disclosure can be applied.

FIG. 20 shows an example of an AI system to which the technical features of the present disclosure can be applied.

Referring to FIG. 20, in the AI system, at least one of an AI server 2020, a robot 2010*a*, an autonomous vehicle 2010*b*, an XR device 2010*c*, a smartphone 2010*d* and/or a home appliance 2010*e* is connected to a cloud network 2000. The robot 2010*a*, the autonomous vehicle 2010*b*, the XR device 2010*c*, the smartphone 2010*d*, and/or the home appliance 2010*e* to which the AI technology is applied may be referred to as AI devices 2010*a* to 2010*e*.

The cloud network 2000 may refer to a network that forms part of a cloud computing infrastructure and/or resides in a cloud computing infrastructure. The cloud network 2000 may be configured using a 3G network, a 4G or LTE network, and/or a 5G network. That is, each of the devices 2010*a* to 2010*e* and 2020 consisting the AI system may be connected to each other through the cloud network 2000. In particular, each of the devices 2010*a* to 2010*e* and 2020 may communicate with each other through a base station, but may directly communicate with each other without using a base station.

The AI server 2020 may include a server for performing AI processing and a server for performing operations on big data. The AI server 2020 is connected to at least one or more of AI devices constituting the AI system, i.e. the robot 2010*a*, the autonomous vehicle 2010*b*, the XR device 2010*c*, the smartphone 2010*d* and/or the home appliance 2010*e* through the cloud network 2000, and may assist at least some AI processing of the connected AI devices 2010*a* to 2010*e*. The AI server 2020 can learn the ANN according to the machine learning algorithm on behalf of the AI devices 2010*a* to 2010*e*, and can directly store the learning models and/or transmit them to the AI devices 2010*a* to 2010*e*. The AI server 2020 may receive the input data from the AI devices 2010*a* to 2010*e*, infer the result value with respect to the received input data using the learning model, generate a response and/or a control command based on the inferred result value, and transmit the generated data to the AI devices 2010*a* to 2010*e*. Alternatively, the AI devices 2010*a* to 2010*e* may directly infer a result value for the input data using a learning model, and generate a response and/or a control command based on the inferred result value.

Various embodiments of the AI devices 2010*a* to 2010*e* to which the technical features of the present disclosure can be applied will be described. The AI devices 2010*a* to 2010*e* shown in FIG. 20 can be seen as specific embodiments of the AI device 1900 shown in FIG. 19.

The present disclosure can have various advantageous effects.

For example, CU and/or AMF can determine whether to allow a manual CAG selection by a UE for a specific CAG ID associated with a PLMN based on a situation/circumstance of the PLMN.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a central unit (CU) in a wireless communication system, the method comprising:
    receiving, from a distribution unit (DU), information regarding whether to allow a manual closed access group (CAG) selection on a CAG identifier (ID) not included in a list of allowed CAG IDs of a wireless device for each of public land mobile networks (PLMNs);
    receiving, from an access and mobility management function (AMF), a list of PLMNs supported by the AMF;
    determining CAG control information regarding at least one PLMN for which a manual CAG selection on a CAG ID not included in the list of allowed CAG IDs of the wireless device is allowed, based on the list of PLMNs supported by the AMF and the information received from the DU; and
    transmitting, to the DU, the CAG control information.

2. The method of claim 1, further comprising:
    determining CAG control information further regarding at least one other PLMN for which a manual CAG selection on a CAG ID not included in the list of allowed CAG IDs of the wireless device is not allowed, based on the list of PLMNs supported by the AMF and the information received from the DU.

3. The method of claim 1, further comprising:
    transmitting, to the AMF, the information regarding whether to allow the manual CAG selection on the CAG ID not included in the list of allowed CAG IDs of the wireless device for each of the PLMNs,
    wherein the CAG control information is determined by the AMF based on the list of PLMNs supported by the AMF and the information, after transmitting the information to the AMF.

4. The method of claim 1, further comprising:
generating system information comprising the CAG control information,
wherein the transmitting the CAG control information comprises transmitting the system information comprising the CAG control information to the DU.

5. The method of claim 1, wherein the CAG control information is transmitted to the DU via a F1AP SETUP RESPONSE message, and
wherein the CAG control information is encoded at the DU and broadcasted by the DU to wireless devices via system information.

6. The method of claim 5, wherein the system information comprises at least one of a system information block type 1 (SIB1) or SIB10.

7. The method of claim 1, wherein the CAG control information is transmitted to the DU via a F1AP GNB CU CONFIGURATION UPDATE message.

8. The method of claim 1, wherein the information is received from the DU via a F1AP SETUP REQUEST message, and
wherein the list of PLMNs supported by the AMF is received from the AMF via a NGAP NG SETUP RESPONSE message.

9. A method performed by a wireless device in a wireless communication system, the method comprising:
receiving, from a distributed unit (DU), closed access group (CAG) control information regarding at least one public land mobile network (PLMN) for which a manual CAG selection on a CAG identifier (ID) not included in a list of allowed CAG IDs of the wireless device is allowed;
manually selecting a CAG ID based on the CAG control information; and
accessing a CAG cell related to the manually selected CAG ID,
wherein the CAG control information is determined based on a list of PLMNs supported by an access and mobility management function (AMF) and manual CAG selection control information configured in the DU.

10. The method of claim 9, wherein the manually selecting the CAG ID comprises:
manually selecting the CAG ID among all available CAG IDs based on that the CAG cell related to the CAG ID belongs to the at least one PLMN informed by the CAG control information,
wherein the all available CAG IDs comprise one or more CAG IDs included in the list of allowed CAG IDs of the wireless device, and one or more CAG IDs not included in the list of allowed CAG IDs of the wireless device.

11. The method of claim 10, wherein the manually selecting the CAG ID comprises:
manually selecting the CAG ID not included in the list of allowed CAG IDs of the wireless device.

12. The method of claim 9, wherein the manually selecting the CAG ID comprises:
manually selecting the CAG ID included in the list of allowed CAG IDs of the wireless device based on that the CAG cell related to the CAG ID does not belong to the at least one PLMN informed by the CAG control information.

13. The method of claim 9, wherein the manual CAG selection control information regarding whether to allow a manual CAG selection on a CAG ID not included in a list of allowed CAG IDs of the wireless device for each of PLMNs.

14. The method of claim 9, wherein the wireless device is in communication with at least one of a user equipment, a network, or autonomous vehicles other than the wireless device.

15. A central unit (CU) in a wireless communication system, comprising:
a transceiver;
a memory; and
at least one processor operatively coupled to the transceiver and the memory, and configured to:
control the transceiver to receive, from a distribution unit (DU), information regarding whether to allow a manual closed access group (CAG) selection on a CAG identifier (ID) not included in a list of allowed CAG IDs of a wireless device for each of public land mobile networks (PLMNs);
control the transceiver to receive, from an access and mobility management function (AMF), a list of PLMNs supported by the AMF;
determine CAG control information regarding at least one PLMN for which a manual CAG selection on a CAG ID not included in the list of allowed CAG IDs of the wireless device is allowed, based on the list of PLMNs supported by the AMF and the information received from the DU; and
control the transceiver to transmit, to the DU, the CAG control information.

* * * * *